US008849685B2

(12) United States Patent
Oden

(10) Patent No.: US 8,849,685 B2
(45) Date of Patent: Sep. 30, 2014

(54) SYSTEM FOR REAL-TIME ON-DEMAND PROVISIONING, FULFILLING, AND DELIVERING FULL SERVICE PROFESSIONAL SERVICES

(76) Inventor: Tracy Denise Oden, Sugar Hill, GA (US)

( * ) Notice: Subject to any disclaimer, the term of this patent is extended or adjusted under 35 U.S.C. 154(b) by 1671 days.

(21) Appl. No.: 11/380,467

(22) Filed: Apr. 27, 2006

(65) Prior Publication Data

US 2006/0247959 A1 Nov. 2, 2006

Related U.S. Application Data

(60) Provisional application No. 60/675,587, filed on Apr. 29, 2005.

(51) Int. Cl.
*G06Q 10/00* (2012.01)
*G06Q 30/06* (2012.01)
*G06Q 10/10* (2012.01)
*G06Q 10/06* (2012.01)

(52) U.S. Cl.
CPC .......... *G06Q 30/06* (2013.01); *G06Q 10/1095* (2013.01); *G06Q 10/06315* (2013.01); *G06Q 10/06313* (2013.01); *G06Q 10/06311* (2013.01); *G06Q 10/06312* (2013.01); *G06Q 10/06316* (2013.01); *G06Q 10/063112* (2013.01); *G06Q 10/063* (2013.01); *G06Q 10/063118* (2013.01)
USPC ....................................................... 705/7.11

(58) Field of Classification Search
USPC ....................................................... 705/7.11
See application file for complete search history.

(56) References Cited

U.S. PATENT DOCUMENTS

| 5,694,551 | A  | * | 12/1997 | Doyle et al. ............... 705/26.62 |
| 5,901,214 | A  | * | 5/1999  | Shaffer et al. ............ 379/211.02 |
| 5,905,792 | A  | * | 5/1999  | Miloslavsky ............ 379/265.11 |
| 6,134,530 | A  | * | 10/2000 | Bunting et al. ............. 705/7.25 |
| 6,189,003 | B1 | * | 2/2001  | Leal ........................................ 1/1 |
| 6,233,600 | B1 | * | 5/2001  | Salas et al. .................... 709/201 |
| 6,466,914 | B2 | * | 10/2002 | Mitsuoka et al. ........... 705/7.14 |
| 6,470,338 | B1 | * | 10/2002 | Rizzo et al. ........................... 1/1 |
| 6,535,600 | B1 | * | 3/2003  | Fisher et al. ............. 379/265.12 |
| 6,567,784 | B2 | * | 5/2003  | Bukow ........................ 705/7.14 |
| 6,792,395 | B2 | * | 9/2004  | Roberts ........................ 702/188 |
| 6,904,449 | B1 | * | 6/2005  | Quinones ...................... 709/203 |
| 6,907,119 | B2 | * | 6/2005  | Case et al. ............... 379/218.01 |
| 6,954,736 | B2 | * | 10/2005 | Menninger et al. ............ 705/28 |
| 7,069,242 | B1 | * | 6/2006  | Sheth et al. ...................... 705/37 |
| 7,080,117 | B2 | * | 7/2006  | de Pinto et al. ............... 709/203 |
| 7,114,146 | B2 | * | 9/2006  | Zhang et al. .................. 717/106 |

(Continued)

OTHER PUBLICATIONS

Correlating customer service with IT intelligence Denise Dubie. Network World. Southborough: Mar. 14, 2005. vol. 22, Iss. 10; p. 28, 1 pgs.*

(Continued)

*Primary Examiner* — Scott L Jarrett

(57) ABSTRACT

A system and method for selling, provisioning, transacting, fulfilling, delivering and supporting simple and complex business and technical professional services in an on demand fashion for various service industries based specifically around the life cycle development relative to the specialized industry. The on demand selling, fulfillment and delivery of business and technical professional services is accomplished through a previously unused system which allows services to be administered from a plurality of specialized consultants to end clients via a 'retail type' framework which is built upon a converged Internet, call center, telecommunications and ancillary software platform.

18 Claims, 11 Drawing Sheets

(56) References Cited

U.S. PATENT DOCUMENTS

| | | | | |
|---|---|---|---|---|
| 7,165,041 | B1* | 1/2007 | Guheen et al. | 705/26.1 |
| 7,272,575 | B2* | 9/2007 | Vega | 705/80 |
| 7,277,865 | B1* | 10/2007 | Silverstone et al. | 705/26.4 |
| 7,330,821 | B2* | 2/2008 | Wares | 705/7.17 |
| 7,464,045 | B2* | 12/2008 | McSherry | 705/7.29 |
| 7,464,046 | B2* | 12/2008 | Wilson et al. | 705/7.15 |
| 7,693,735 | B2* | 4/2010 | Carmi et al. | 705/7.16 |
| 7,698,398 | B1* | 4/2010 | Lai | 709/223 |
| 7,752,080 | B1* | 7/2010 | Greener | 705/26.1 |
| 7,814,142 | B2* | 10/2010 | Mamou et al. | 709/203 |
| 7,849,438 | B1* | 12/2010 | Hemmat et al. | 717/102 |
| 7,870,535 | B2* | 1/2011 | Rippert et al. | 717/100 |
| 7,881,957 | B1* | 2/2011 | Cohen et al. | 1/1 |
| 7,921,024 | B2* | 4/2011 | Hogan et al. | 705/7.22 |
| 7,945,469 | B2* | 5/2011 | Cohen et al. | 705/7.14 |
| 8,073,762 | B2* | 12/2011 | Sheth et al. | 705/37 |
| 8,086,501 | B2* | 12/2011 | Rao | 705/26.4 |
| 8,099,311 | B2* | 1/2012 | La Vecchia et al. | 705/7.14 |
| 8,126,781 | B2* | 2/2012 | Hurley et al. | 705/26.1 |
| 8,135,627 | B2* | 3/2012 | Shoen et al. | 705/26.41 |
| 8,161,120 | B2* | 4/2012 | Tan | 709/206 |
| 8,204,790 | B1* | 6/2012 | Rogers et al. | 705/26.1 |
| 8,239,830 | B2* | 8/2012 | Ionfrida et al. | 717/121 |
| 8,332,470 | B2* | 12/2012 | Arun et al. | 709/204 |
| 2001/0032170 | A1* | 10/2001 | Sheth | 705/37 |
| 2001/0044768 | A1* | 11/2001 | Wares | 705/37 |
| 2002/0026398 | A1* | 2/2002 | Sheth | 705/37 |
| 2002/0064149 | A1* | 5/2002 | Elliott et al. | 370/352 |
| 2002/0082937 | A1* | 6/2002 | Retherford | 705/26 |
| 2002/0123983 | A1* | 9/2002 | Riley et al. | 707/1 |
| 2002/0128891 | A1* | 9/2002 | McSherry | 705/8 |
| 2002/0161619 | A1* | 10/2002 | Ham et al. | 705/9 |
| 2003/0018705 | A1* | 1/2003 | Chen et al. | 709/202 |
| 2003/0046169 | A1* | 3/2003 | Fraser et al. | 705/26 |
| 2003/0144969 | A1* | 7/2003 | Coyne | 705/400 |
| 2003/0172145 | A1* | 9/2003 | Nguyen | 709/223 |
| 2004/0019579 | A1* | 1/2004 | Herz et al. | 707/1 |
| 2005/0010456 | A1* | 1/2005 | Chang et al. | 705/7 |
| 2005/0171858 | A1* | 8/2005 | Cotton et al. | 705/26 |
| 2006/0004623 | A1* | 1/2006 | Jasti | 705/10 |
| 2006/0112086 | A1* | 5/2006 | Douress et al. | 707/3 |
| 2006/0227952 | A1* | 10/2006 | Cohen et al. | 379/201.02 |
| 2006/0230113 | A1* | 10/2006 | Lundberg et al. | 709/206 |
| 2007/0127400 | A1* | 6/2007 | McKibben et al. | 370/260 |
| 2012/0259671 | A1* | 10/2012 | Oden | 705/7.17 |

OTHER PUBLICATIONS

Clarify and Architel Partner to Provide First Integrated Front Office to Back Office Provisioning Capability for the Telecommunications Industry PR Newswire. New York: Apr. 13, 1998. p. 1.*

Hernandez, Tomas, Building a gateway for Internet contracting Building Design & Construction, vol. 41, No. 1, Jan. 2000.* eLance Powers Corel's New Services Marketplace PR Newswire, Nov. 15, 2000.*

Geyer, Werner et al., A Team Collaboration Space Supporting Capture and Access of Virual Meetings ACM Group'01, Sep. 30-Oct. 3, 2001.*

Successful Outsourcing—A Free Step-By-Step Guide on How to Use Getacoder GetaCoder.com, 2004-2007.*

Rosati, Fabio, The Future of eProcurement Services Supply Chain Elance, Inc., ISM Conference, Dec. 2, 2004.*

Strobel, Michael, Dynamic Outsourcing of Services IBM Research, Computer Science/Mathematics, Jun. 12, 2000.*

NAICS Association 54 Professional, Scientific and Technical Services definition NAICS.com, Jan. 28, 2014.*

* cited by examiner

SYSTEM FOR REAL-TIME ON-DEMAND PROVISIONING, FULFILLING, AND DELIVERING FULL SERVICE PROFESSIONAL SERVICES

FIELD OF THE INVENTION

The present invention is in the field of professional services specifically related to life cycle development relative to specialized industries. The present invention provides a system and method by which professional services (legal, accounting, engineering, etc), but more specifically Information Technology services may be sold by an organization, provisioned, transacted, fulfilled, delivered and supported in an on demand fashion. By way of this invention, Professional Services Organizations (PSOS) will be able to provide access to company services on an as needed just-in-time basis by offering the ability to:

Sell simple and complex professional services on demand via retail in real time.

Enable clients to procure services (communicate need for services) in real time.

Enable client to purchase simple and complex professional services on demand via retail in real time.

Enable client to transact services (facilitate engagement, collaborate in project scoping process, sign contractual documents and make initial payment for services) in real time.

Enable consultants to provision services (plan for engagement, project or work product, route engagement, project or work product) in real time.

Enable consultants to fulfill (analyze, design, develop, test, train) engagement, project or work products remotely in real time.

Enable clients to collaborate with consultants and track engagement, project or work product progression in real time.

Enable clients to provide quality assurance, acceptance and incremental payments of engagement, project or work product in real time.

Enable consultants to deliver, rollout or place in production engagement, project or work product remotely in real time Enable clients to receive work products (deliverables) in real time.

Enables consultants to provide ongoing support of engagement, project or work products in real time.

All processes as related above are performed via a converged call center, telecommunication, Internet and ancillary technologies platform.

SUMMARY OF THE INVENTION

To address the foregoing limitations which exist in the prior art, the present invention provides a system and method by which various service industries may sell, procure, transact, provision, fulfill, deliver and support simple and complex professional services in real time.

Real time sales and delivery of professional services is accomplished through a previously unused system which enable professional services practitioners to provision, fulfill and deliver professional services remotely and allow clients to minimally communicate need for service, collaborate with consultants, create and sign contract documents, watch as services are being fulfilled, provide project acceptance, pay for services and track project management activities in an automated, systemized and real time fashion.

BACKGROUND OF THE INVENTION

The essence of professional services consulting is to assist clients with business and/or technology initiatives. Assistance is often provided in the form of advice, meeting or session leadership and participation and through the completion of work products or deliverables that are deemed necessary during the course of the engagement. A consultant's role is to listen, brainstorm, and help the client think through issues by analyzing problems, offering corrective solutions and completing assigned work.

Consulting is available today in many flavors. Services may be brokered by large international blue chip firms, mid market organizations, small business entities and independent consultants. While the size of the professional services firm may vary, sales and delivery methods are normally the same. Sales cycles are often very long, firms are dependent on credit receivables, service prices are typically very expensive and delivery is more than likely non standard, unpredictable and premise based.

Today, business is radically different from what existed only a few years ago. Adapting to rapid change is a constant challenge in every organization, market and industry-even more so in the business and technical professional services consulting world. Although spearheading, organizing and facilitating change for many new economy clients-many professional services consulting companies still operate using out dated sales and delivery methods.

In order to survive in today's fast paced 'on demand' economy, consulting firms, also known as Professional Services Organizations (PSOs), must transform their businesses from the traditional PSO model to a worldwide services model that delivers strategically streamlined services in a real time, standardized, more cost efficient, and geographically agnostic manner.

As adoption of on demand software technology (*Software as a Service*) gains favor within the business and technology community, it simply makes sense for professional services firms to adopt a virtual framework for Just-In-Time (JIT) consulting. To date, a JIT services model within the professional services industry hasn't existed. The advent of this invention; coupled with call center, telecommunications, Internet and many ancillary next generation technologies, solves this need.

Figure 1:
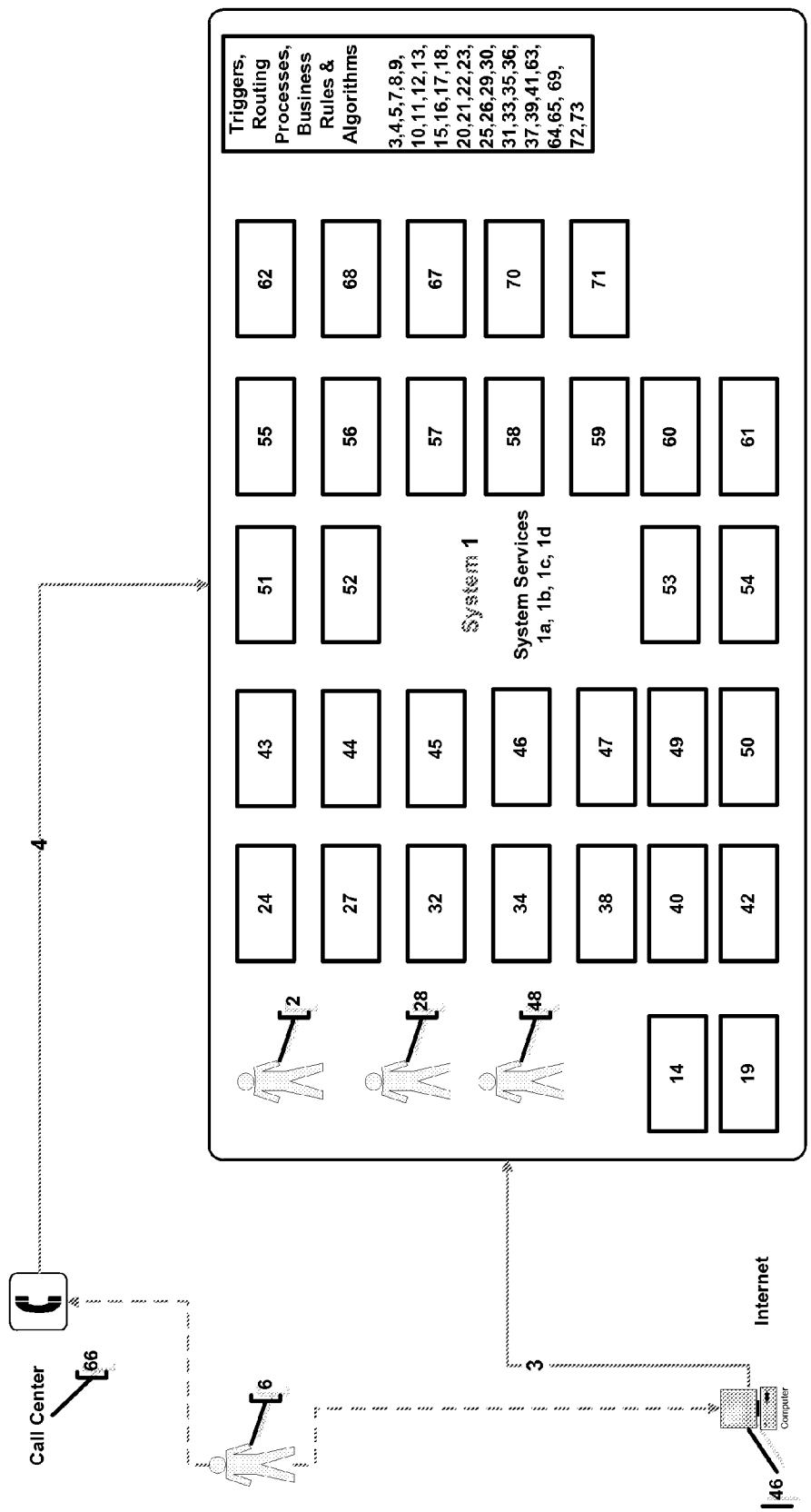

If the client (6) requires deliverable outsourcing support (1c) or a service within life cycle professional services (1d), the consultant (48) will receive the ticket after the EM (28) concludes the interviewing (32), scoping (44,8,9,38,70), and contract (42,33,7) process. The consultant (48) may begin fulfilling (40,50,51,10,11) the engagement according to the Statement of Work (38). Fulfillment (40,50,51,10,11) and delivery (43,58,59,12,13) of deliverable outsourcing support and life cycle professional services may be fulfilled (40,50, 51,10,11) and delivered (43,58,59,12,13) in real time via remote control technologies (55), web based collaboration and conferencing (webinars) (55), email (55), telephonic conferencing (55) and by any other means by which we may deem appropriate to facilitate real time fulfillment (40,50,51, 10,11) and delivery (43,58,59,12,13) in the future. The client (6) is able to collaborate (10,11,12,13,50,51,52,53,58,59,31, 41,46,47) with the consultant (28), as needed, via telephone (66,52,53) and/or via the portal (46,51,59). The client (6) may provide acceptance (5,37,61), feedback (5,37,61), modification requests (5,37,61) and payment (54,18,39,56) of work as work is modularly completed (18,19,20,21,39,37,5,61,54) via the portal (46,47,31,41). The client (6) may view outsourced work (1c,1d,51,59) in real time, via the portal (46), as it is progressively fulfilled (18,19,20,21,39,37,5,61,54). Clients (6) may track project progress (1c,1d, 51,59,18,19,20, 21,39,37,5,61,54), view project (1a,1b,1c,1d,38,) history and notes, chat (55) with consultants (48), view project status (1c,1d,38), view project analytics (1a,1b,1c,1d,38,2,6,28,48) and more in real time.

FIG. 1 is a high level depiction of an embodiment of the professional services system (1). As shown in FIG. 1, a user (6) may access the system (1) and its productized services and associated methods and processes (1a, 1b, 1c, 1d) via contacting a PSO's call center (66) or by accessing the PSO's portal (46). Customer service representatives (2), engagement managers (28), consultant managers (28), project managers (48) and other consultants (48) have direct access to the system (1)(1a, 1b, 1c, 1d). The system includes an embodiment of components (14,19,24,27,32,34,38,40,42,43,44,45, 46,47,49,50,51,52,53,54,55,56,57,58,59,60,61,62, 70,71) and supporting triggers, routing processes, business rules and algorithms (3,4,5,7,8,9,10,11,12,13,15,16,17,18,20,21,22, 23,25, 26,29,30,31,33,35,36,37,39,41,63,64, 65,72,73).

Figure 7:
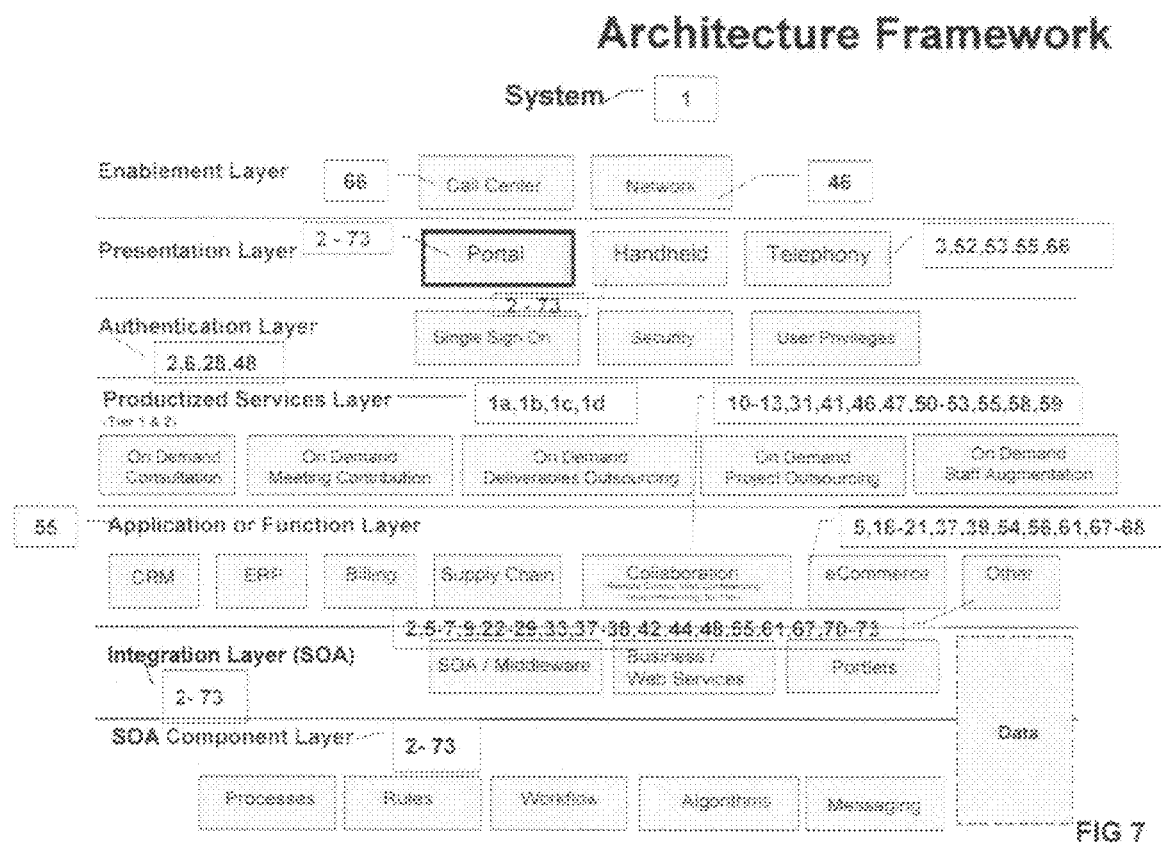
Figure 8:
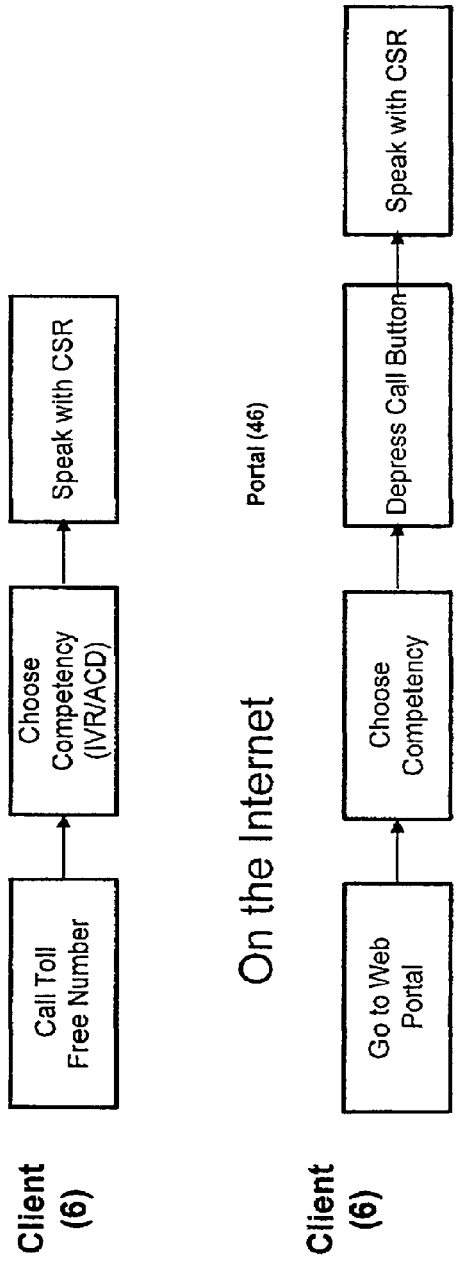
FIG. 8 is a high level depiction of an embodiment of the professional services procurement process. A user (6) may procure professional services in two ways: By calling a PSO's call center (66) or by visiting the PSO online (46). 1) When procuring services by calling a call center (66), the user (6) will a) dial a toll free number b) choose a professional services competency and its corresponding service from the IVR/ACD (55) tree. c) Speak to CSR (2) to inform of services need. 2) When procuring services online (46), the user (6) will a) go the portal (46) b) Choose a professional services competency and then a corresponding service c) depress a call button (3) which will connect the user to the PSO's call center (66) via a telephonic method (3,55) d) Speak to CSR (2) to inform of services need.
Figure 9:
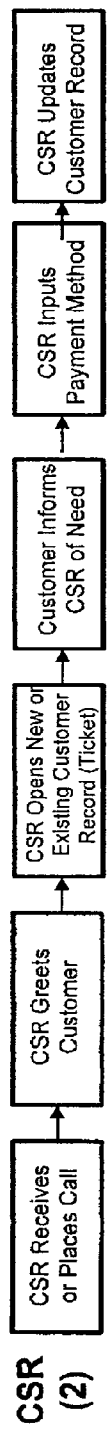
FIG. 9 is a high level depiction of an embodiment of the professional services transaction process. A CSR (2) will receive or place a call to the user (6). The CSR (2) will open or create a new service record (14). The user (6) will inform CSR (2) of need. The CSR (2) will gather payment data (67,68,54,18,39) from client (6). The CSR (2) will process payment (54,18,39,19,20,21) if it is a consulting advice (1a) or meeting contribution (1b) request. The CSR (2) will populate service ticket (14) with detailed client information.
Figure 10:
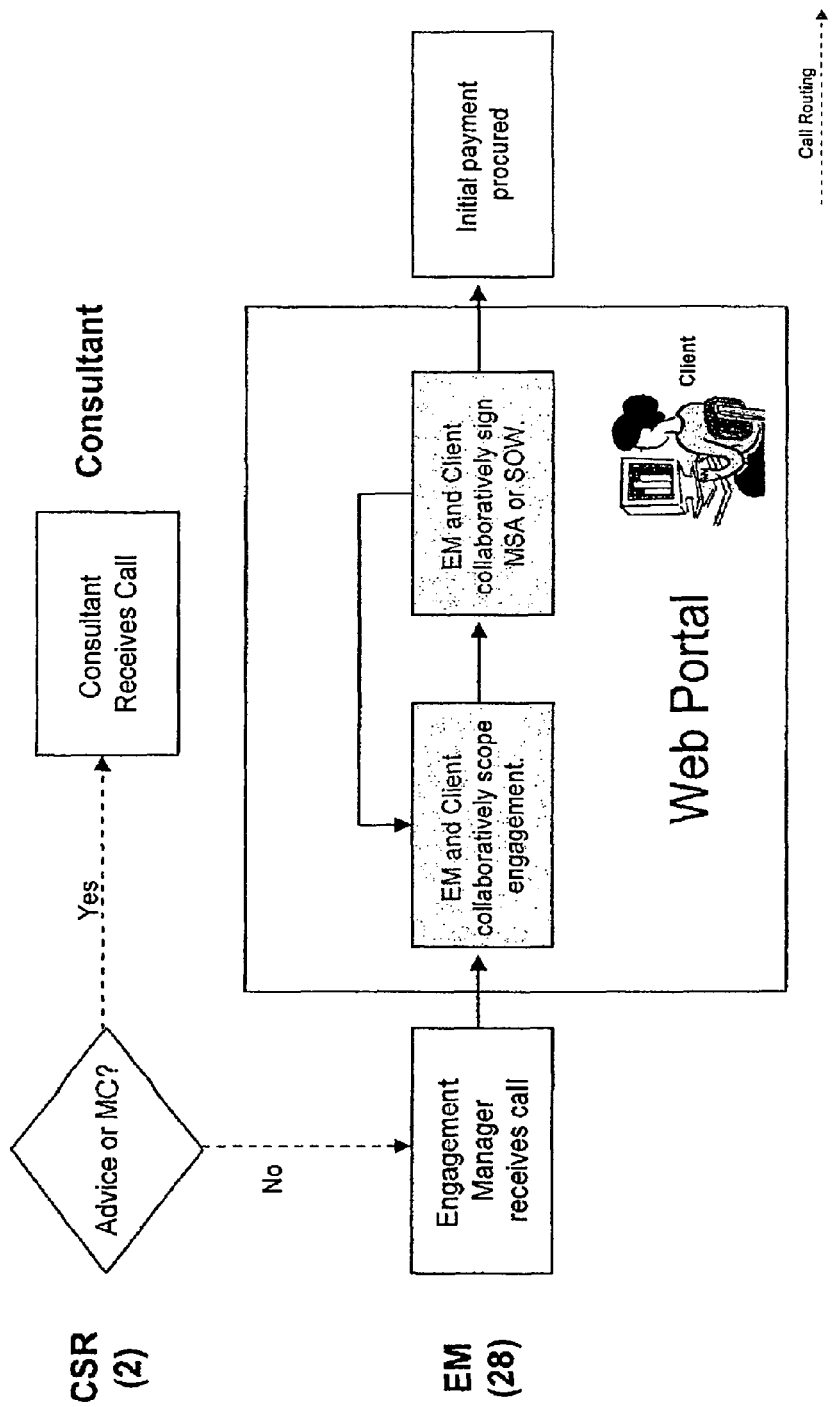
FIG. 10 is a high level depiction of an embodiment of the professional services provisioning process. The CSR (2) will identify service type (1a,1b,1c,1d) i.e., consulting advice, meeting contribution, deliverable outsourcing support or life cycle professional services and update ticket (14). The ticket (14) and client (6) is auto routed (15,16,17) through the system (1) based on the Consultant 2 Client (C2C) load balancing process (25,26,27,29). C2C (25,26,27,29) encompasses a series of business rules, logistics and routing algorithms to include, but is not limited to, data inputted in the service ticket, consultant availability, consultant work load, consultant skill-sets, time of day, country of origin, language, etc. The ticket (14) and the client (6) is routed (15,16,17) in real time to a Consultant (48) or an Engagement Manager (28). If the client (6) requires consulting advice (1a) or meeting contribution (1b) (see FIG. D for more info). If the client (6) requires deliverable outsourcing support (1c) or a service within life cycle professional services (1d), the EM (28) and client (6) interview (32) begins which leads to the automated scoping process (44,8,9,38,70). The EM (28) and/or Consultant (48) and client (6) will collaboratively scope (44,8,9,38, 70) the engagement. This is an iterative automated process (44,8,9,38,70) until acceptance (5,37,61) and sign off (38) can occur. The interview (32) and scoping process (44,8,9, 38,70) may be performed simultaneously via telephone (66, 52,53) and/or on the portal (46,51,59). The Statement of Work (38), which includes scope (38) and an incremental acceptance and payment schedule (38), will eventually be accepted (5,37,61) and signed digitally (42,33,7) and/or a signed hard copy (42,33,7) uploaded via the portal (46,47,31,41). The EM (28) and client (6) will likewise collaborate (10,11,12,13,50, 51,52,53,58,59,31,41,46,47) on the contract process (5,37, 61,38,42,33,7). This is an iterative automated process (5,37, 61,38,42,33,7,10,11,12,13,50,51,52,53,58,59) until final acceptance (5,37,61) and sign off (42,33,7) can occur. The entire scoping (44,8,9,38,70), contract (42,33,7), acceptance (5,37,61) and signoff (42,33,7) process may be performed via telephone (66,52,53) and/or on the portal (46,51,59,47,31, 41). Contract (42,33,7) will eventually be accepted (5,37,61) and signed digitally (42,33,7) and/or a signed hard copy (42, 33,7) uploaded via the portal (46,47,31,41). Initial payment (54,18,39,56) for deliverable outsourcing (1c) or life cycle professional services (1d) is processed according to an automated Incremental Acceptance and Payment Schedule (18, 19,20,21,39,37,5,61,54).
Figure 11:
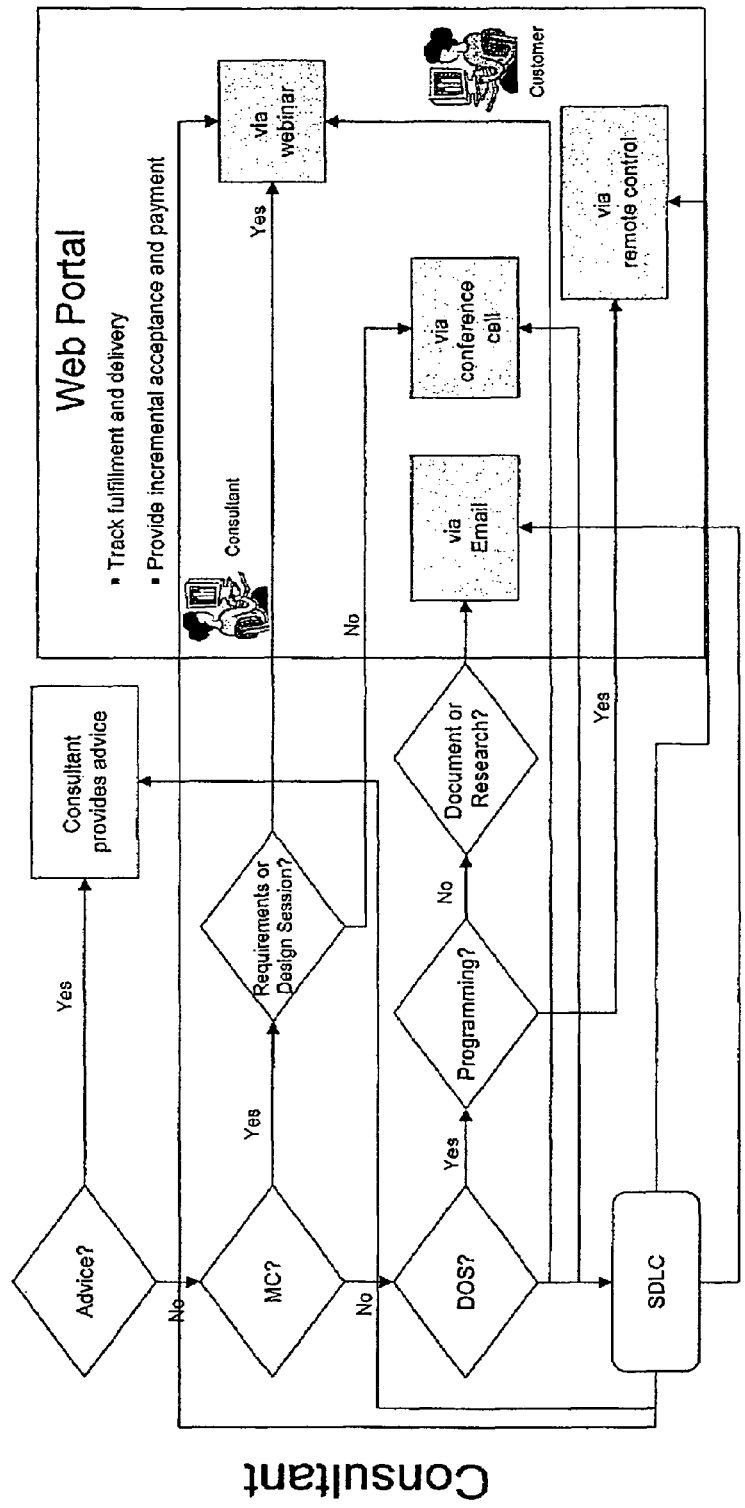
FIG. 11 is a high level depiction of an embodiment of the professional services fulfillment (40,50) and delivery (43,58) process. The ticket (14) and the client (6) is routed (15,16,17) in real time to a Consultant (48). If the client (6) requires consulting advice (1a), the consultant (48) provides advice (1a) via telephone (66,52,53) in real time. If the client (6) requires the consultant (48) to facilitate or participate in a meeting (1b) or a session (1b) of some type, the consultant (48) participates in a meeting contribution (1b) by arranging and scheduling an appointment (22,23,24,25,26,27,29) to participate in the meeting (1b) or session (1b) according to the Statement of Work (38). Meeting contributions (1b) may be one time or recurring, they may be fulfilled (40,50,51,10,11) on demand or at future date and time. Likewise, meeting contributions (1b) may be fulfilled (40,50,51,10,11) and delivered (43,58,59,12,13) via telephone conferencing (55) or by webinar (55) depending on the Statement of Work (38).

FIG. 7 is another representation of FIG. 1.

Figure 2:
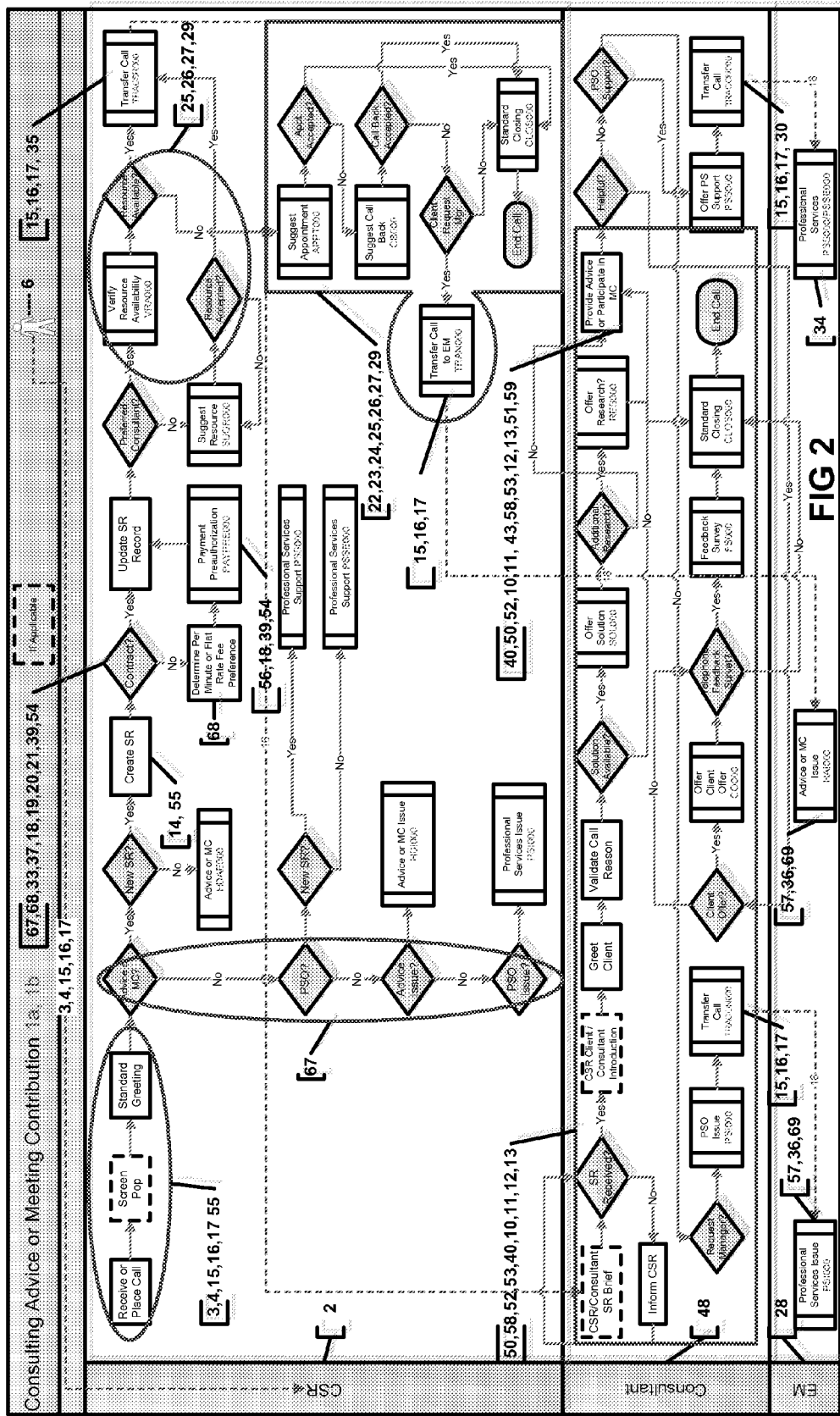

FIG. 2 is a depiction of an embodiment of the consulting advice (1a) or meeting contribution (1b) services method. As shown in FIG. 2, a user (6) may access the system (1) to receive real time consulting advice (1a) and/or meeting contribution (1b) services. The client (6) may access the system (1) via the call center (66) or via the portal (46) (see FIG. 1, FIG. A for more details). The client (6) will begin speaking with a CSR (2) after gaining access via communication gateway (3), telephony (55), call center (66) and ancillary COTS (55). The CSR (2) will greet client (6), begin interview (67) and account or on demand discovery (68) processes. The CSR (2) will create or open existing service record (14, 55) if the system (1) and its supporting COTS-CTI (55) fails to make the record (14) available in an automated manner (3,4,15,16, 17 55). The CSR (2) will determine whether the client (6) is a prepaid customer (account) or a cash customer (18,19,20,21, 39,54,33,37,67,68). The CSR (2) will validate consultant (48) availability (25,26,27,29) if a specific consultant (48) is requested. If the consultant (48) is unavailable, the CSR (2) will set an appointment (22,23,24,25,26,27,29) for followup. If the client (6) chooses to override appointment (22,23, 24,25,26,27,29) and prefers to speak to next available consultant (48), the system (1) will utilize its automated routing (15,16,17) to locate next available consultant (48). The service record (14) and the client (6) will be routed (15,16,17) to a consultant (48). The consultant (48) will fulfill (40,50,52, 10,11) and deliver (43,58,53,12,13) consulting advice (1a) in real time via a telephonic fulfillment (52) and delivery (53) method. The consultant (48) will fulfill (40,50,51,10,11) and deliver (43,58,59,12,13) meeting contribution (1b) services on demand or at a future date and time via telephonic conferencing (55) and/or via web based collaboration and conferencing (55). If there is a problem (57,36,39) or issue (57,36,39) that need resolving, the client (6) and/or ticket (14) will be routed to an Engagement Manager (28) or Consulting Manager (28) to resolve.

Figure 3:
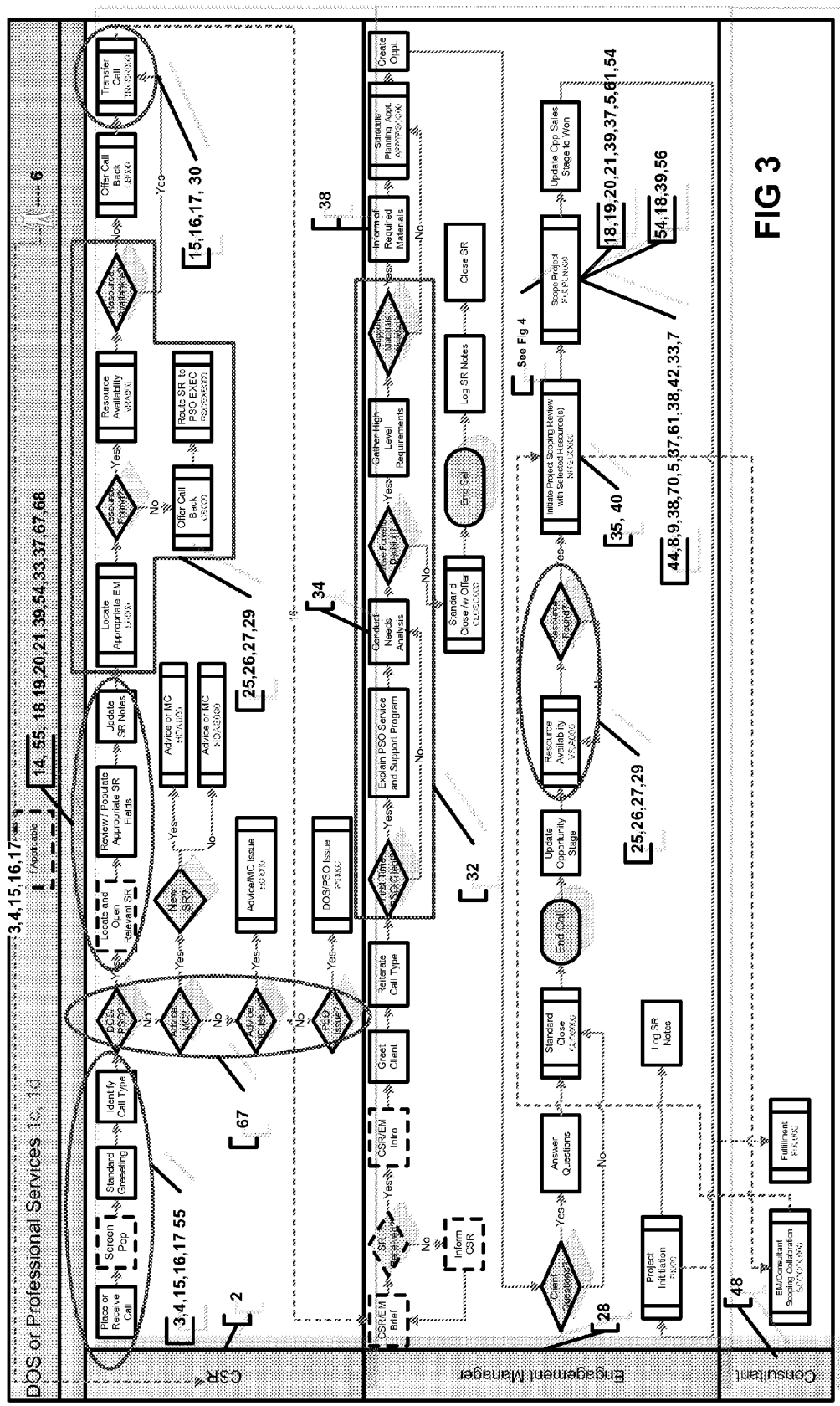

FIG. 3 is a depiction of an embodiment of the deliverable outsourcing support (1c) or life cycle professional services (1d) method. As shown in FIG. 3, a user (6) may access the system (1) to receive deliverable outsourcing support (1c) and/or life cycle professional services (1d). The client (6) may access the system (1) via the call center (66) or via the portal (46) (see FIG. 1, FIG. A for more details). The client (6) will begin speaking with a CSR (2) after gaining access via communication gateway (3), telephony, call center and ancillary COTS (55). The CSR (2) will greet client (6), begin interview (67) and account or on demand discovery (68) processes. The CSR (2) will create or open existing service record (14, 55) if the system (1) and its supporting COTS-CTI (55) fails to make the record (14) available in an automated manner. The CSR (2) will determine whether the client (6) is a prepaid customer (account) or a cash customer (18,19,20,21,39,54, 33,37,67,68). The CSR (2) will validate engagement manager (28) availability (25,26,27,29). If an EM (28) is unavailable, the CSR (2) will set an appointment (22,23,24,25,26,27,29) for follow-up. If appointment (22,23,24,25,26,27,29) is not needed, the system (1) will auto route (15,16,17) to locate next available EM (28). The ticket (14) and the client (6) is received in real time by an EM (28). The EM (28) and client (6) interview (32) begins which leads to the automated scoping process (44,8,9,38,70). The EM (28) and/or Consultant (48) and client (6) will collaboratively scope (44,8,9,38,70) the engagement. This is an iterative automated process (44, 8,9,38,70) until acceptance (5,37,61) and sign off (38) can occur. The interview (32) and scoping process (44,8,9,38,70) may be performed simultaneously via telephone (66,52,53) and/or on the portal (46,51,59). The Statement of Work (38), which includes scope (38) and an incremental acceptance and payment schedule (38), will eventually be accepted (5,37,61) and signed digitally (42,33,7) and/or a signed hard copy (42, 33,7) uploaded via the portal (46,47,31,41). The EM (28) and client (6) will likewise collaborate (10,11,12,13,50,51,52,53, 58,59,31, 41,46,47) on the contract process (5,37,61,38,42, 33,7). This is an iterative automated process (5,37,61,38,42, 33,7,10,11,12,13,50,51,52,53,58,59) until final acceptance (5,37,61) and sign off (42,33,7) can occur. The entire scoping (44,8,9,38,70), contract (42,33,7), acceptance (5,37,61) and signoff (42,33,7) process may be performed via telephone (66,52,53) and/or on the portal (46,51,59,47,31,41). Contract (42,33,7) will eventually be accepted (5,37,61) and signed digitally (42,33,7) and/or a signed hard copy (42,33,7) uploaded via the portal (46,47,31,41). Initial payment (54,18, 39,56) for deliverable outsourcing (1c) or life cycle professional services (1d) is processed according to an automated Incremental Acceptance and Payment Schedule (18,19,20, 21,39,37,5,61,54).

Figure 4:
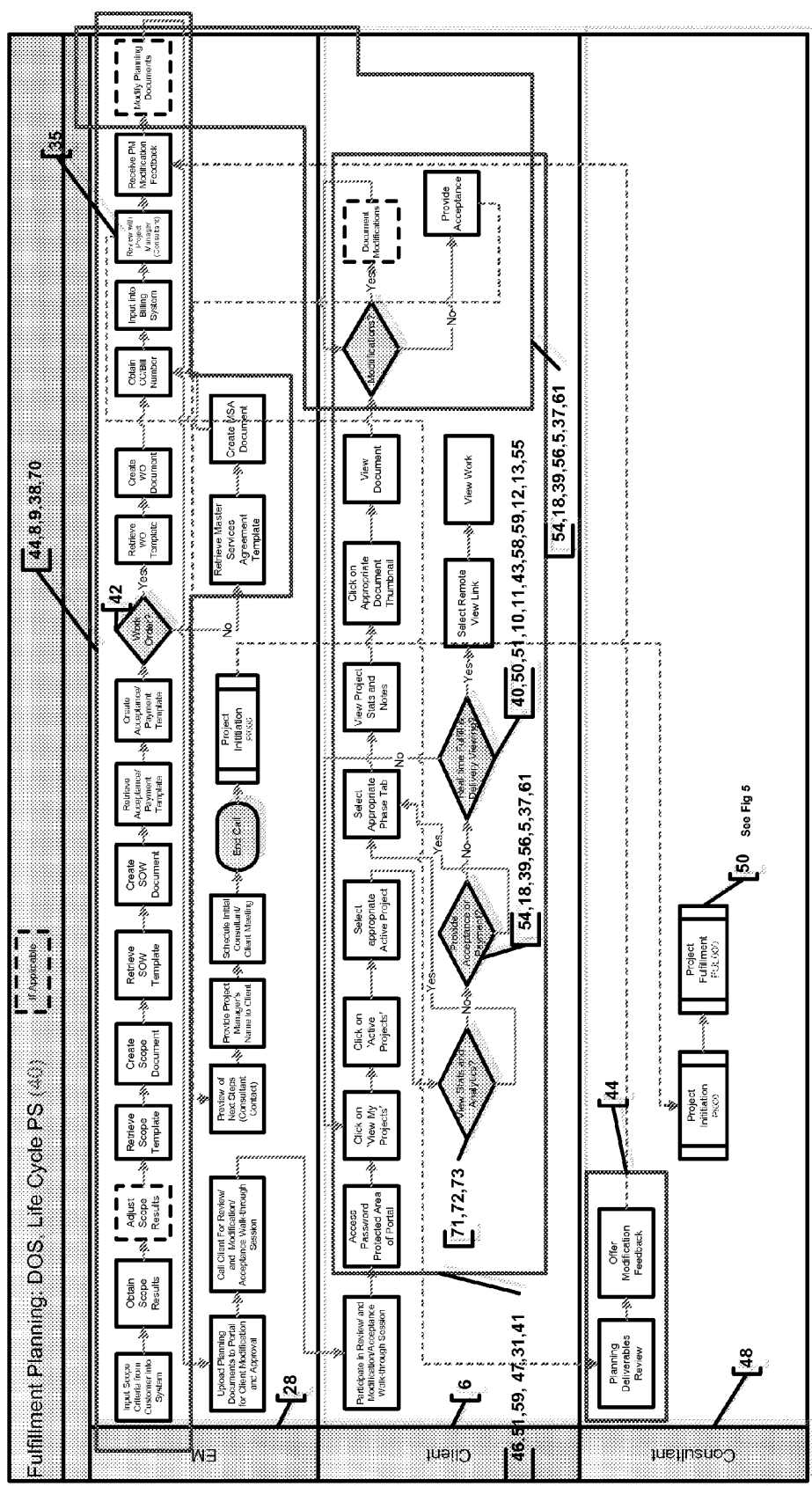

FIG. 4 is a depiction of an embodiment of a more detailed view of the fulfillment planning process (40) pertaining to deliverable outsourcing support (1c) or the life cycle professional services (1d) method. As shown in FIG. 4, an EM (28) will begin the fulfillment planning process (40) by scoping the engagement. The EM (28) will input client interview (32) data into the system (1). The data will be inputted into a scoping engine (70), contained within the system (1) which will, according to the interview data (32) inputted, dynamically return scoping results (44,8,9,38,70) based upon interview (32) responses. Scoping results (44,8,9,38,70) may minimally include at least man hours, level of effort, size of engagement, delivery duration, human and technical resources needed, deliverables required, ancillary fees, project assumptions, potential risks and cost of engagement. The scoping engine (44,8,9,38,70) will minimally output auto-generated pre-populated project, cost and contract materials (38). The EM (28) will modify forms (38) as needed. To facilitate collaboration (10,11,12,13,50,51,52,53,58,59,31,41,46,47) with the client (6) to receive scoping acceptance (5,37,61), the EM will upload scoping (44,8,9,38,70) forms (38) to the portal (46, 51,59,47,31,41). The EM (28) client (6) and/or consultant (48) will modify (5,37,61) forms (38) as needed until acceptance (5,37,61) occurs. Once the client (6) provides acceptance (5,37,61), signs (42,33,7) all pertinent paperwork (38) and pays initial fees (54,18,39,56), the client will gain immediate access to additional portal (46,51,59,47,31,41) functionality to include project management tracking (71,72,73) which minimally includes project management stats, notes, history, analytics, and reports. The portal (46,51,59,47,31,41) also enables the client (6) to collaborate with EMs (28) and consultants (48) via chat or web based conference collaboration (55) capabilities, view outsourced work products and/or paper deliverables in real time as they are being remotely (55) fulfilled (40,50,51,10,11) and delivered (43,58,59,12,13). See FIG. 5 for more information.

Figure 5:
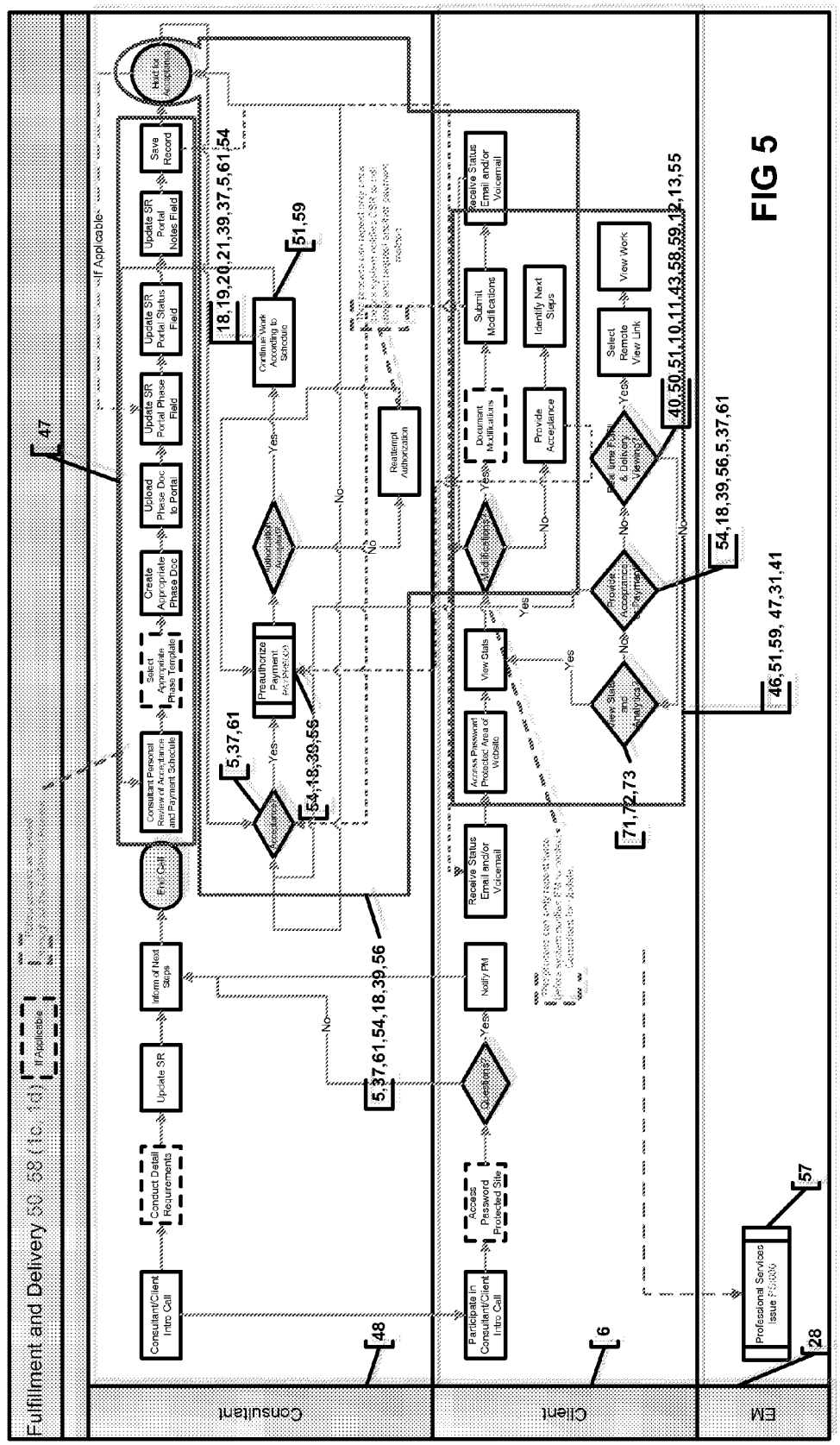

FIG. 5 is a depiction of an embodiment of a more detailed view of the fulfillment and delivery process (50) pertaining to deliverable outsourcing support (1c) or the life cycle professional services (1d) method. As shown in FIG. 5, as the consultant (48) fulfills outsourced work, the system (1) enables the consultant (48) to minimally upload (46,51,59, 47,31,41) paper documents, notes, and service record (14) details to the portal (46,51,59,47,31,41). This is an iterative and incremental process (46,51,59,47,31,41). The consultant (48) will continue this process according to the Incremental Acceptance and Payment Schedule (18,19,20,21,39,37,5,61, 54) until full payment (54,18,39,56), acceptance (5,37,61) and fulfillment activities (40,50,51,10,11) conclude. The client (6) can also use portal (46,51,59,47,31,41) functionality to perform project management tracking (71,72,73) activities which minimally include viewing project management stats, notes, history, analytics, and reports. The client is also able to chat and or collaborate with consultants (48) via web based collaboration and conferencing (55) capabilities. Likewise, the portal (46,51,59,47,31,41) enables the consultant (48) to fulfill (40,50,51,10,11) and deliver (43,58,59,12,13) outsourced work products and paper deliverables remotely (55) and enables the client (6) to view outsourced work products and/or paper deliverables in real time as they are being remotely (55) fulfilled (40,50,51,10,11) and delivered (43,58, 59,12,13). Ongoing support of projects will be fulfilled (40, 50,51,10,11) and delivered (43,58,59,12,13) in the same manner.

Figure 6:
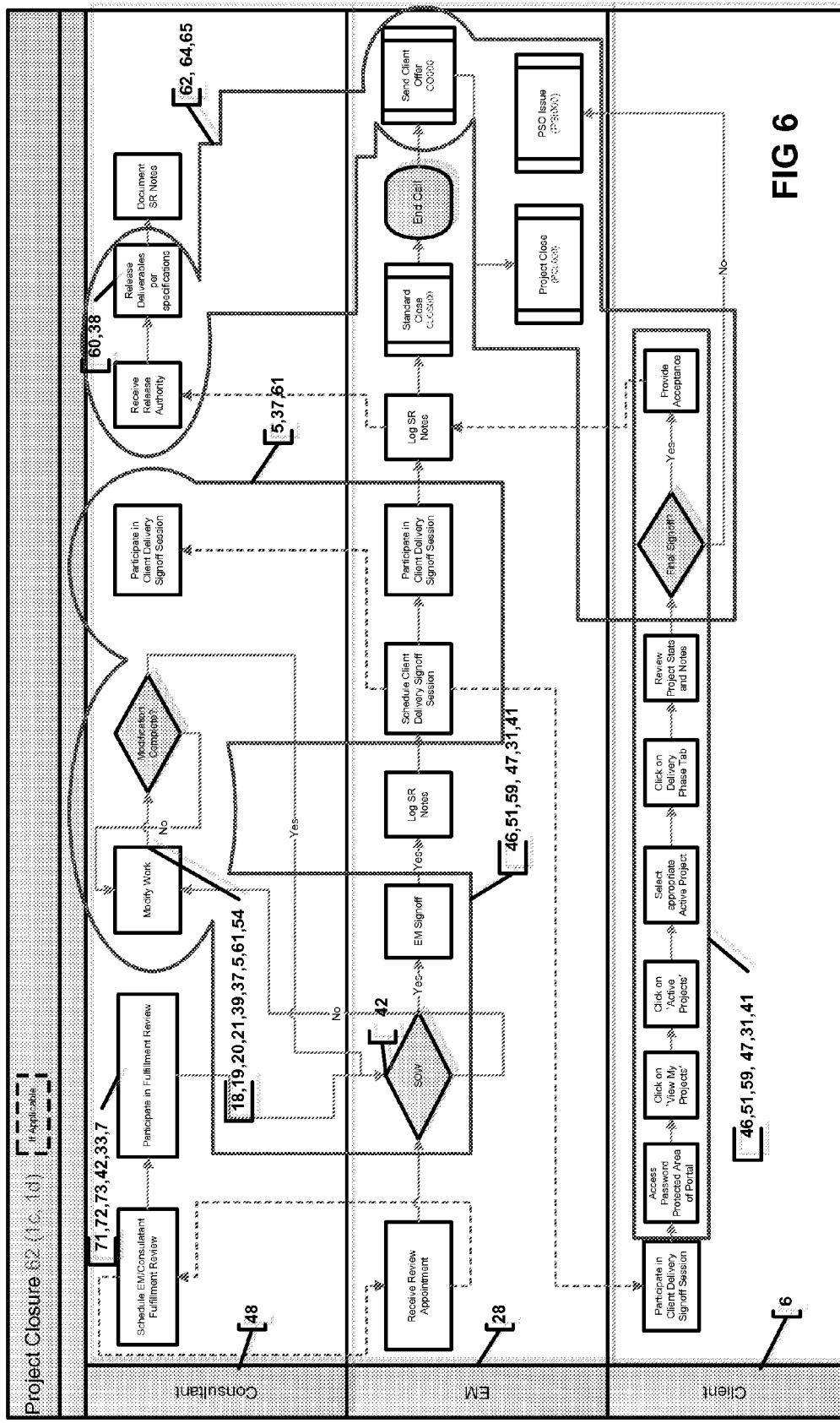

FIG. 6 is a depiction of an embodiment of the project closure process (62,64,65) pertaining to deliverable outsourcing support (1c) or life cycle professional services (1d). As shown in FIG. 6, the project closure process (62,64,65) consists of the engagement manager (28) and the consultant (28) participating in an acceptance (5,37,61), and signoff (5,37, 61) loop where the EM (28) and the consultant (48) work in an iterative manner to ensure that all tasks (71,72,73,42,33,7) and milestones (71,72,73,42,33,7) have been met. The culmination includes satisfying all conditions of the contract (42, 33,7) and handing over final materials (60,38). Final signoff (5,37,61) includes the client (6), the consultant (48) and the engagement manager (28) working collaboratively via the telephone (52) and the portal (46,51,59,47,31,41).

DETAILED DESCRIPTION

In an embodiment of the present invention, professional services are sold, procured, transacted, provisioned, fulfilled, delivered and supported, in real time, using a novel business method. A model for on demand sales and service delivery capabilities is outlined as follows:

A user (6) may procure professional services in two ways: By calling a call center (66) or by visiting online (46).
1) When procuring services by calling a call center (66), the user (6) will a) dial a toll free number b) choose a professional services competency and its corresponding service from the IVR/ACD (55) tree. c) The client (6) will then speak to a CSR (2) to inform of services need.
2) When procuring services online (46), the user (6) will a) go the portal (46) b) choose a professional services competency and then a corresponding service c) depress a call button (3), which will enable the user to fill out a web based form before telephonically (3,55) connecting the user to the call center (66) d) The client (6) will then speak to the CSR (2) to inform of services need.

If the client (6) requires consulting advice (1a) or meeting contribution (1b), the CSR (2) will greet client (6), begin interview (67) and account discovery (68) process. The CSR (2) will create or open existing service record (14, 55) if the system (1) and its supporting COTS-CTI (55) fails to make the record (14) available in an automated manner (3,4,15,16, 17 55). The CSR (2) will determine whether the client (6) is a prepaid customer (account) or a cash customer (18,19,20,21, 39,54,33,37,67,68), authorize credit card or other payment method (54,18,39,56) and receive deposited payment (56). The CSR (2) will validate consultant (48) availability (25,26, 27,29) if a specific consultant (48) is requested. If the consultant (48) is unavailable, the CSR (2) will set an appointment (22,23,24,25,26,27,29) for follow-up. If the client (6) chooses to override appointment (22,23,24,25,26,27,29) and prefers to speak to next available consultant (48), the ticket (14) and client (6) is auto routed (15,16,17) through the system (1) based on the Consultant 2 Client (C2C) load balancing process (25,26,27,29). C2C (25,26,27,29) encompasses a series of business rules, logistics and routing algorithms to minimally include service ticket (14) data, consultant availability, consultant work load, consultant skill-sets, time of day, country of origin, language, etc. The service record (14) and the client (6) will be routed (15,16,17) to a consultant (48). The consultant (48) will fulfill (40,50,52,10,11) and deliver (43,58,53,12,13) consulting advice (1a) in real time via a telephonic fulfillment (52) and delivery (53) method. The consultant (48) will fulfill (40,50,51,10,11) and deliver (43,58,59,12,13) meeting contribution (1b) services on demand or at a future date and time via telephonic conferencing (55) and/or via web based collaboration and conferencing (55). If there is a problem (57,36,39) or issue (57,36,39) that need resolving, the client (6) and/or ticket (14) will be routed to an Engagement Manager (28) or Consulting Manager (28) to resolve.

If the client (6) requires deliverable outsourcing support (1c) or life cycle professional services (1d), the CSR (2) will greet client (6), begin interview (67) and account discovery (68) process. The CSR (2) will create or open an existing service record (14, 55) if the system (1) and its supporting COTS-CTI (55) fails to make the record (14) available in an automated manner. The CSR (2) will determine whether the client (6) is a prepaid customer (account) or a cash customer (18,19,20,21,39,54,33,37,67,68). The CSR (2) will validate Engagement Manager (28) availability (25,26,27,29). If an EM (28) is unavailable, the CSR (2) will set an appointment (22,23,24,25,26,27,29) for follow-up. If appointment (22,23, 24,25,26,27,29) is not needed, the ticket (14) and client (6) is auto routed (15,16,17) through the system (1) based on the Consultant 2 Client (C2C) load balancing process (25,26,27, 29). C2C (25,26,27,29). The ticket (14) and the client (6) is received in real time by an EM (28) responsible for scoping the engagement and ensuring that all contracts (38) and waivers (38) are signed (42,33,7). The EM (28) and client (6) interview (32) begins which leads to the automated scoping process (44,8,9,38,70). The EM (28) will input client interview (32) data into the system (1). The data will be inputted into a scoping engine (70), contained within the system (1) which will, according to the interview data (32) inputted, dynamically return scoping results (44,8,9,38,70) based upon interview (32) responses. Scoping results (44,8,9,38,70) may minimally include at least man hours, level of effort, size of engagement, delivery duration, human and technical resources needed, deliverables required, ancillary fees, project assumptions, potential risks and cost of engagement. The scoping engine (44,8,9,38,70) will minimally output auto-generated pre-populated project, cost and contract materials (38). The EM (28) and/or Consultant (48) and client (6) will collaboratively scope (44,8,9,38,70) the engagement together. This is an iterative automated process (44,8,9,38,70) until acceptance (5,37,61) and sign off (38) can occur. The interview (32) and scoping process (44,8,9,38,70) may be performed simultaneously via telephone (66,52,53) and on the portal (46,51,59, 47,31,41). The Statement of Work (38), which includes scope (38) and an incremental acceptance and payment schedule (38), will eventually be accepted (5,37,61) and signed digitally (42,33,7) or a signed hard copy (42,33,7) uploaded via the portal (46,47,31,41). The EM (28) and client (6) will likewise collaborate (10,11,12,13,50,51,52,53,58,59, 31, 41,46,47) on the contract process (5,37,61,38,42,33,7). This is an iterative automated process (5,37,61,38,42,33,7, 10,11,12,13,50,51,52,53,58,59) until final acceptance (5,37, 61) and sign off (42,33,7) can occur. The entire scoping (44,8,9,38,70), contract (42,33,7), acceptance (5,37,61) and signoff (42,33,7) process may be performed via telephone (66,52,53) and on the portal (46,51,59,47,31,41). Contract (42,33,7) will eventually be accepted (5,37,61) and signed digitally (42,33,7) or a signed hard copy (42,33,7) uploaded via the portal (46,47,31,41). Initial payment (54,18,39,56) for deliverable outsourcing (1c) or life cycle professional services (1d) is processed according to an automated Incremental Acceptance and Payment Schedule (18,19,20,21,39,37,5, 61,54). The EM (28) will modify forms (38) as needed. To facilitate collaboration (10,11,12,13,50,51,52,53,58,59,31,41,46,47) with the client (6) to receive scoping acceptance (5,37,61), the EM will upload scoping (44,8,9,38,70) forms (38) to the portal (46, 51,59,47,31,41). The EM (28) client (6) and/or consultant (48) will modify (5,37,61) forms (38) as needed until acceptance (5,37,61) and initial payment (54,18,39,56) occurs. Once the client (6) provides project initiation acceptance (5,37,61), signs (42,33,7) all pertinent paperwork (38) and makes initial payment (54,18,39,56), the ticket (14) and client (6) is auto routed (15,16,17) through the system (1) based on the Consultant 2 Client (C2C) load balancing process (25,26, 27,29). The ticket (14) and the client (6) is received in real time by a Consultant (48) responsible for fulfillment and delivery.

As the consultant (48) fulfills (40,50,51,10,11) outsourced work, the system (1) enables the consultant (48) to minimally upload (46,51,59,47,31,41) paper documents, notes, and service record (14) details to the portal (46,51,59,47,31,41). This is an iterative and incremental process (46,51,59,47,31,41). The consultant (48) will continue this process according to the Incremental Acceptance and Payment Schedule (18,19, 20,21,39,37,5,61,54) and until full payment (54,18,39,56), acceptance (5,37,61) and fulfillment activities (40,50,51,10, 11) conclude. The client (6) can also use portal (46,51,59,47, 31,41) functionality to perform project management tracking activities (71,72,73) which minimally include viewing real time project management stats, notes, history, analytics, and reports. The client is also able to chat or collaborate with consultants (48) via web based collaboration and conferencing (55) capabilities. Likewise, the portal (46,51,59,47,31,41) enable the consultant (48) to fulfill (40,50,51,10,11) and deliver (43,58,59,12,13) outsourced work products and paper deliverables remotely (55) and enables the client (6) to view outsourced work products and/or paper deliverables in real time. Ongoing support of projects will be fulfilled (40,50,51, 10,11) and delivered (43,58,59,12,13) in the same manner.

The system (1) enables project closure. The project closure process (62,64,65) consists of the engagement manager (28) and the consultant (28) participating in an acceptance (5,37, 61), and signoff (5,37,61) loop where the EM (28) and the consultant (48) work in an iterative manner to ensure that all tasks (71,72,73,42,33,7) and milestones (71,72,73,42,33,7) have been met. The culmination includes satisfying all conditions of the contract (42,33,7) and handing over final materials (60,38). Final signoff (5,37,61) include the client (6), the consultant (48) and the engagement manager (28) working collaboratively via telephone (52) and the portal (46,51,59, 47,31,41).

Some of the commercial off the shelf (COTS)(55) software, tools, technologies and methodologies which may be used in achieving the full functionality of the system include: web conferencing, conference call technologies, webinars, email, document management, digitizing, file transfer protocol, remote control, IVR, ACD, CTI, CRM, ERP, project management, supply chain, logistics, field engineering, financial, e-commerce, billing, provisioning, project management, portal, call center, and SOA (Service Oriented Architecture). Though other technologies, tools, software and methodologies may be used, these are viewed as likely tools used to achieve system (1) performance. Any of these may be useful in designing the current system (1) architecture. The current invention shall, where appropriate, call upon the use of any current or future tools, technologies, software, methodologies or capabilities to perform its function.

LIST OF REFERENCE MATERIALS

A High Level Procurement Process
B High Level Transaction Process
C High Level Provisioning Process
D High Level Fulfillment & Delivery Process
E High Level Portal Design and Project Management Tracking Process 1 System
1*a* Consulting Advice Component
1*b* Meeting Contribution Component
1*c* Deliverable Outsourcing Component
1*d* Professional Service (Full Life Cycle) Component
2 Customer Service Representative (CSR)
3 Communication Gateway
4 CSR Trigger
5 Acceptance Business Rules
6 Client (Customer, User)
7 Contract Business Rules
8 Scoping Triggers
9 Scoping Business Rules
10 Fulfillment Triggers
11 Fulfillment Business Rules
12 Delivery Triggers
13 Delivery Business Rules
14 Ticket
15 Routing Triggers
16 Automated Routing System
17 Routing Business Rules
18 Payment Business Rules
19 Billing Process
20 Billing Business Rules
21 Billing Triggers
22 Appointment Business Rules
23 Appointment Triggers
24 Appointment Process
25 Load Balancing (C2C) Communication Trigger
26 Load Balancing Algorithm (C2C)
27 Load Balancing Process
28 Engagement Manager (EM) or Consultant Manager (CM)
29 Load Balancing Business Rules
30 EM Trigger
31 portal Business Rules
32 EM Interview
33 Contract Trigger
34 Life Cycle Professional Services Process
35 Consultant Trigger
36 Issue Triggers
37 Acceptance Triggers
38 Electronic Materials
39 Payment Triggers
40 Fulfillment Planning Process
41 Portal Triggers
42 Contract Creation Process
43 Delivery Planning Process
44 Scoping Activities
45 Conference Call Delivery
46 Portal
47 Portal Refreshing Process
48 Consultant or Project Manager
49 Email Fulfillment
50 Fulfillment Activities
51 Remote Fulfillment
52 Telephone Fulfillment
53 Telephone Delivery
54 Payment Authorization Activities
55 COTS
56 Revenue
57 Issue Activities
58 Delivery Activities
59 Remote Delivery
60 Email Delivery
61 Project Acceptance Activities
62 Project Closure Activities
63 Acceptance Business Rules 64 Closure Triggers
65 Closure Business Rules
66 Call Center
67 CSR Interview
68 Account or On Demand Discovery Process
69 Issue Business Rules
70 Scoping Engine
71 Project Management Tracking Activities
72 Project Management Business Rules
73 Project Management Triggers Terminology Description Professional Services: Infrequent, technical, or unique functions performed by independent contractors or consultant whose occupation is the rendering of such services. While not limited to licentiates (individuals holding professional license), the services are considered "professional" and the contract may run to partnership, firms, or corporations as well as to individuals. Examples of professional services contracts include: accountants, appraisers, archaeologists, attorneys, business consultants, architects and engineers, law firms physicians, performing artists, researchers, real estate brokers and technical engineers. The selection of an independent contractor or consultant providing professional services is usually based on skill, knowledge, reputation, and creativity. Price may be a secondary factor in the selection.—Wikipedia Professional Services Organization (PSO): A corporate body specializing in professional services containing one or more independent contractors or consultants.

On Demand: The want or desire to possess a good or service, in real time, as need arises.

Real Time: A computer term which means 'occurring immediately'. Just In Time (JIT): An inventory strategy implemented to improve the return on investment of a business by reducing in-process inventory and its associated costs. The process is driven by a series of signals that tell production to make the next part.—Wikipedia Client: A PSO customer.

Procure: The ability to communicate need for services.

Transact: The ability to facilitate conversation, engagement or initiative; to collaborate in the project scoping process; sign contractual documents and make initial payment for services.

Provision: "Provisioning" equates to "Initiation". To plan for engagement, project or work product; to route engagement, project or work product.

Fulfill: The activities performed once an order is received. To analyze, design, develop, test, train engagement, project or work products remotely. The ability to enable clients to receive work products(deliverables) in real time.

Deliver: The process of transporting services. The ability to deliver, rollout or place in production engagement, project or work product remotely.

Support: Technical support is a range of services providing assistance with computer hardware, software, or other electronic or mechanical goods. In general, technical support services attempt to help the user solve specific problems with a product—rather than providing training, customization, or other support services. The ability to provide ongoing support of engagement, project or work products.

Track: The process of event reconstruction. The ability to view detail history, notes, stats, analytics, etc., for engagement project or work product progression. The ability to provide quality assurance, acceptance and incremental payments of engagement, project or work product Information Technology: A broad subject concerned with technology and other aspects of managing and processing information, especially in large organizations. In particular, IT deals with the use of electronic computers and computer software to convert, store, protect, process, transmit, and retrieve information. For that reason, computer professionals are often called IT specialists, and the division of a company or university that deals with software technology is often called the IT department. Other names for the latter are information services (IS) or management information services (MIS), managed service providers (MSP).—Wikipedia Systems Development Life Cycle: or SDLC, is defined by the United States Department Of Justice as a software development process, although it is also a distinct process independent of software or other Information Technology considerations. It is used by a systems analyst to develop an information system, including requirements, validation, training, and user ownership through investigation, analysis, design, implementation and maintenance. SDLC is also known as information systems development or application development. An SDLC should result in a high quality system that meets or exceeds customer expectations, within time and cost estimates, works effectively and efficiently in the current and planned information technology infrastructure, and is cheap to maintain and cost-effective to enhance. SDLC is a systems approach to problem solving and is made up of several phases, each comprised of multiple steps.—Wikipedia Project: A project is a temporary endeavor undertaken to achieve a particular aim and to which project management can be applied, regardless of the project's size, budget, or timeline.—Project Management Institute Engagement: Project Initiative: Project Project Management: The discipline of defining and achieving targets while optimizing the use of resources (time, money, people, materials, energy, space, etc) over the course of a project.—Wikipedia Competency: Things that a firm can do well and that meet the following three conditions specified by Hamel and Prahalad (1990). 1. It provides customer benefits, 2. It is hard for competitors to imitate, and 3. it can be leveraged widely to many products and market.—Wikipedia Services: Outputs of a competency, services are the non-material equivalent of a good.

Productized Services: Services that are transitioned from an intangible good into a tangible 'service product' that can be delivered in a predictable, scalable and repeatable way to radically improve operational efficiencies and customer satisfaction.

Consulting Advice: A service that enable consultants to render an opinion, a decision or a course of action to problem or an issue. Consulting Advice is a professional services 'service' relevant to this invention.

Meeting Contribution: A service that enables consultants to facilitate or participate in a meeting or session of some type. Meeting Contribution is a professional services 'service' relevant to this invention.

Deliverable Outsourcing Support: A service that enables consultants to fulfill and deliver outsourced technical or functional work products or paper deliverables in real time. Deliverable Outsourcing Support a professional services 'service' relevant to this invention.

Life Cycle Professional Services: A service that enables consultants to fulfill and deliver simple or complex (technical or functional) projects according to the phase associated with the System Development Life Cycle. Life Cycle Professional Services is a professional services 'service' relevant to this invention.

Remote: A term used as the opposite of local, meaning a resource which can only be accessed via a network.—Wikipedia Remote Fulfillment: The ability to fulfill content over a network.

Remote Delivery: The ability to deliver content over a network.

Work Products: The output created by a consultant during the course of a project, i.e., development, testing, training, testing, files processes, (manufacturing process. training process, disposal process, etc.).

Deliverables: The artifact created by a consultant during the course of a project, i.e., documents, specification, and contracts, etc.

Web Conferencing: Used to hold group meetings or live presentations over the Internet. In the early years of the Internet, the terms "web conferencing" and "computer Confrencing" were often used to refer to group discussions conducted within a message board (via posted text messages), but the term has evolved to refer specifically to "live"or "synchronous" meetings, while the posted message variety of discussion is called a "forum", "message board", or "bulletin board".

In a web conference, each participant sits at their own computer, and is connected to other participants via the internet. The most basic feature of a web conference is screen sharing, whereby conference participants see whatever is on the presenter's screen. Usually this is accompanied by voice communication, either through a traditional telephone conference, or through VoIP, although sometimes text chat is used in place of voice.—Wikipedia Call Center: A centralized office used for the purpose of receiving and transmitting a large volume of requests by telephone. A call centre is operated by a company to administer incoming product support or information inquiries from consumers. Outgoing calls for telemarketing, clientele, and debt collection are also made. In addition to a call centre, collective handling of letters, faxes, and e-mails at one location is known as a contact centre.

A call centre is often operated through an extensive open workspace, with work stations that include a computer, a telephone set/headset connected to a telecom switch, and one or more supervisor stations. It can be independently operated or networked with additional centres, often linked to a corporate computer network, including mainframes, microcomputers and LANs. Increasingly, the voice and data pathways into centre are linked through a set of new technologies called computer telephony integration (CTI).—Wikipedia Telecommunications: The communication of information over a distance. ).—Wikipedia Telephony: The general use of equipment to provide voice communication over distances. Rapid advancement in digital electronics is revolutionized telephony by providing alternate means of voice communication than that provided by traditional telephone systems. IP telephony is a modern form of telephony which uses the TCP/IP protocol popularized by the internet to transmit digitized voice data.—Wikipedia Ticket: A routable computer record which minimally contains relevant customer, product, service history, partner info, accounts, activities, calendars, notes, etc., data. A ticket is also called service request, issue and task.

Portal: A site on the World Wide Web that typically provide personalized capabilities to their visitors. They are designed to use distributed applications, different numbers and types of middleware and hardware to provide services from a number of different sources. In addition, business portals are designed to share collaboration in workplaces. A further business-driven requirement of portals is that the content be able to work on multiple platforms such as personal computers, personal digital assistants (PDAs), and cell phones.—Wikipedia IVR: Interactive Voice Response is a computerized system that allows a person, typically a telephone caller, to select an option from a voice menu and otherwise interface with a computer system. Generally the system plays pre-recorded voice prompts to which the person presses a number on a telephone keypad to select the option chosen, or speaks simple answers such as a "yes", "no", or numbers in answer to the voice prompts.—Wikipedia ACD: Automatic Call Distributor is a device that distributes incoming calls to a specific group of terminals that agents use. It is often part of a computer telephony integration system.—Wikipedia CTI: Computer Telephony Integration enables computers to know about and control phone functions such as making and receiving voice, fax, and data calls with telephone directory services and caller identification.—Wikipedia COTS: Commercial off-the-shelf is a term for software or hardware products that are ready-made and available for sale to the general public. They are often used as alternatives to in-house developments.—Wikipedia NAICS 541: Professional, Scientific, and Technical Services—Industries in the Professional, Scientific, and Technical Services subsector group establishments engaged in processes where human capital is the major input. These establishments make available the knowledge and skills of their employees, often on an assignment basis, where an individual or team is responsible for the delivery of services to the client. The individual industries of this subsector are defined on the basis of the particular expertise and training of the services provider. The distinguishing feature of the Professional, Scientific, and Technical Services subsector is the fact that most of the industries grouped in it have production processes that are almost wholly dependent on worker skills. In most of these industries, equipment and materials are not of major importance, unlike health care, for example, where "high tech" machines and materials are important collaborating inputs to labor skills in the production of health care. Thus, the establishments classified in this subsector sell expertise. Much of the expertise requires degrees, though not in every case.—US Census Bureau Enterprise Architecture—Enterprise architecture (EA) is a well-defined practice for conducting enterprise analysis, design, planning, and implementation, using a holistic approach at all times, for the successful development and execution of strategy. Enterprise Architecture applies architecture principles and practices to guide organizations through the business, information, process, and technology changes necessary to execute their strategies. These practices utilize the various aspects of an enterprise to identify, motivate, and achieve these changes.—Wikipedia Architectural Framework—The ISO/IEC/IEEE 42010 Conceptual Model of Architecture Description defines the term architecture framework as: "An architecture framework establishes a common practice for creating, interpreting, analyzing and using architecture descriptions within a particular domain of application or stakeholder community. Examples of Architecture Frameworks: MODAF, TOGAF, Kruchten's 4+1 View Model, RM-ODP." Especially the domain within a company or other organisation is covered by enterprise architecture frameworks.—Wikipedia Enterprise Architecture Framework—An enterprise architecture framework (EA framework) defines how to create and use an enterprise architecture. An architecture framework provides principles and practices for creating and using the architecture description of a system. It structures architects' thinking by dividing the architecture description into domains, layers or views, and offers models—typically matrices and diagrams—for documenting each view. Enterprise architecture regards the enterprise as a large and complex system or system of systems. To manage the scale and complexity of this system, an architectural framework provides tools and approaches that help architects abstract from the level of detail that builders work at to bring enterprise design tasks into focus and produce valuable architecture description documentation. The components of an architecture framework provide structured guidance that is divided into three main areas:

- Descriptions of architecture: how to document the enterprise as a system from several viewpoints. Each view describes one slice of the architecture; it includes those entities and relationships that address particular concerns of interest to particular stakeholders; it may take the form of a list, a table, a diagram, or a higher level of composite of such.
- Methods for designing architecture: processes that architects follow. Usually, an overarching enterprise architecture process, composed of phases, breaks into lower-level processes composed of finer grained activities. A process is defined by its objectives, inputs, phases (steps or activities) and outputs. It may be supported by approaches, techniques, tools, principles, rules, and practices.
- Organization of architects: guidance on the team structure, the governance of the team, the skills, experience and training needed.—Wikipedia Service-oriented architecture (SOA)—Service-oriented architecture (SOA) is a software design and software architecture design pattern based on discrete pieces of software providing application functionality as services to other applications. This is known as Service-orientation. It is independent of any vendor, product or technology. A service is a self-contained unit of functionality, such as retrieving an online bank statement. Services can be combined by other software applications to provide the complete functionality of a large software application. SOA makes it easy for computers connected over a network to cooperate. Every computer can run an arbitrary number of services, and each service is built in a way that ensures that the service can exchange information with any other service in the network without human interaction and without the need to make changes to the underlying program itself.—Wikipedia Virtual or Virtualization—Virtual or Virtualization, in computing, refers to the act of creating a virtual (rather than actual) version of something, including but not limited to a virtual computer hardware platform, operating system (OS), storage device, or computer network resources. The term "virtualization" traces its roots to 1960s mainframes, during which it was a method of logically dividing the mainframes' resources for different applications. Since then, the meaning of the term has evolved to the aforementioned.—Wikipedia

What is claimed is:

1. A computer system for the on demand and real time sales, provisioning, fulfillment and delivery of full life cycle professional services over a network, the system comprising:
    a processor;
    a computer readable storage medium;
    the processor configured to execute a Service Oriented Architecture (SOA) encompassing one or more technical and operational layers executed by a processor based on computer executable instructions stored in the computer readable storage medium;
    the one or more technical and operational layers comprising an Enablement Layer, a Presentation Layer, a Authentication Layer, a Productized Services Layer, a Applications or Functions Layer, a Integration Layer (SOA), and a SOA Component Layer, wherein each of the one or more technical and operational layers are configured to enable the execution of on demand real time sales, fulfillment and delivery of professional services engagements;
    the Presentation Layer is further configured to enable at least one system user to remotely access the system using one or more User Interface (UI) elements wherein the UI elements are configured to electronically enable at least a user to:
        accept and terminate at least a communication session;
        incrementally create, read, update, delete, assign, lock, activate at least a record source regardless of where, how that record source originates;
        conduct an automated project needs, scope, price, contract analysis that enables at least a user to collaborate with at least one other user to identify, create, electronically process, retain project needs, scope, price, contract throughout the life cycle of the professional services system;
        a payment management element configured to automatically, incrementally create, accept, send, receive, process at least a payment, payment request;
    a document management element configured to electronically scope, price, quote, contract, create, provision, negotiate, track, sign, audit, view, modify, delete, retain, process payment throughout the life of the professional services system;
    a project management element configured to:
        electronically identify, communicate, collaborate, notify, assign, provision, schedule at least a project user;
        sell at least an element of a project;
        provision at least an element of a project for fulfillment;
        kick off, launch, fulfill at least an element of a project;
        electronically sell, provision, fulfill, deliver, post-deliver at least an element of a project in line with at least one life cycle relative to at least one professional services industry;
        electronically sell, provision, fulfill, deliver, post-deliver at least an element of a project in line with at least one industry standard methodology relative to at least one professional services industry;
        electronically sell, provision, fulfill, deliver, post-deliver, at least an element of a project in line with at least one industry regulatory guideline relative to at least one professional services industry;
        electronically sell, provision, fulfill, deliver, post-deliver at least an element of a project in line with configuration flexibility with at least a Professional Services Organization (PSO), at least a PSO practice group, at least a PSO business unit, or other classification;
        electronically sell, provision, fulfill, deliver, post-deliver at least a project element in at least a spoken language;
        electronically collaborate between at least two users on at least one element of a project engagement;
        create, read, update, delete at least a project task element, analytical stat element and historical report element;
        create, read, update, delete, upload, download at least a document send, receive element; wherein is further configured aggregates uploaded and downloaded data contained within documents;

close out at least a project element;
process at least a notification, communication, message for at least a project element;
process at least an assignment, routing, workflow for at least a project element;
remotely access at least a system element of at least one other computer;
take control of at least a system element of at least one other computer;
remotely process at least one element of the at least one system accessed, controlled;
read, write, retrieve at least one data element of the at least one system accessed, controlled into at least a system element;
a call center element wherein at least a user is able to interface online or offline in real time with at least another user to sell, provision, fulfill, deliver, post-deliver at least an element of a on demand, just in time project engagement in a distributed real time manner;
a salesforce automation element wherein at least a user is able to online or offline sell, retain sales related data on a just in time basis at least an element of a on demand, just in time project engagement;
a service automation element wherein at least a user is able to online or offline manage fulfillment, delivery, post-delivery engagements wherein up sales, cross sells is further configured is managed, tracked, incentivized on a just in time basis on at least an element of a on demand, just in time project engagement; wherein is further configured post-delivery support in the form of release management is managed, tracked, audit trailed, reported against on a just in time basis on at least an element of a on demand, just in time project engagement;
a marketing automation element wherein at least a user is able to process marketing campaigns, offers, promotions, discounts, to the professional services public on a just in time basis for at least an element of a on demand, just in time project engagement;
an accounting system element wherein at least a user is able to process accounts payables, receivables, reconcile electronic payments on a just in time basis for at least an element of a on demand, just in time project engagement;
a billing system element wherein at least a user is able to process orders, electronic commerce transactions, billing functions on a just in time basis for at least an element of a on demand, just in time project engagement;
a workforce scheduling element wherein at least a user is able to schedule at least one professional services user onto at least a project, provision at least one professional services user onto at least one project, forecast at least one call center operations pattern on a just in time basis for at least an element of a on demand, just in time project engagement;
a video element wherein at least a user is able to at least collaborate with at least one other user face to face in real time to sell, provision, fulfill, deliver , post-deliver at least an element of a on demand, just in time project engagement; video conferencing element wherein at least a user is able to at least collaborate with at least one other user face to face in real time, share computer screens, whiteboards to sell, provision, fulfill, deliver, post-deliver at least an element of a on demand, just in time project engagement;
an audio element wherein at least a user is able to at least collaborate with at least one other user in real time through at least a triggered audio element to sell, provision, fulfill, deliver, post-deliver at least an element of a on demand, just in time project engagement;
an audio conferencing element wherein at least a user is able to at least collaborate with at least one other user in real time through at least a triggered audio element to sell, provision, fulfill, deliver, post-deliver at least an element of a on demand, just in time project engagement;
a remote control element wherein at least a user is able to at least collaborate with at least one other user in real time by accessing at least one other users computer to sell, provision, fulfill, deliver, post-deliver at least an element of a on demand, just in time project engagement;
a telephony element wherein at least a user is able to at least collaborate with at least one other user in real time to sell, provision, fulfill, deliver, post-deliver at least an element of a on demand, just in time project engagement; wherein is further configured the system automatically triggers at least a telephony communication to sell, provision, fulfill, deliver, post-deliver at least an element of a on demand, just in time project engagement;
a communication element wherein at least a user, wherein at least the system is able to at least trigger messages, notifications, telephony with at least one other user in real time to sell, provision, fulfill, deliver, post-deliver at least an element of a on demand, just in time project engagement;
a security element wherein at least a user is able to at least trigger single sign on, off; wherein the at least a user is able to at least create, read, update, delete at least a user privilege via the security element; wherein the at least a user is able to at least trigger encryption to sell, provision, fulfill, deliver, post-deliver at least an element of a on demand, just in time project engagement;
wherein one or more elements within the Presentation Layer's User Interface functions is further configured triggers any other elements within the Service Oriented Architecture to further process at least an element of a on demand professional services engagement;
wherein the Presentation Layer is further configured to enable one or more handheld device elements to remotely access the system's User Interface, telephony functions; wherein one or more elements within the Presentation Layer's hand held functions is configured further triggers any other elements within the Service Oriented Architecture to process at least an element of a on demand professional services engagement;
wherein the Presentation Layer is further configured to enable one or more telephony elements to remotely access elements within the system's Presentation Layer, Enablement Layer; wherein the telephony element triggers at least an Interactive Voice Response (IVR), Automatic Call Distributor (ACD), Computer Telephony Integration (CTI) element of at least a Commercial Off The Shelf (COTS), at least a custom program code contained in the Applications or Functions Layer; wherein telephony elements is further configured to process IVR, ACD, CTI functions are configured to trigger at least a productized service element, scheduling element, workforce forecasting element, campaign management element, commerce element, electronic commerce element, methodology element, data element; wherein the system's telephony elements is further configured to trigger any other elements within the Service Oriented Architecture to further process at least an element of a on demand professional services engagement.

2. The computer system of claim 1 wherein the Enablement Layer is further configured to enable at least a system user to remotely outsource at least a fully governable life cycle professional services engagement element;
   wherein the system is configured to use at least a network, at least a call center function;
   wherein the network, and the call center function are configured to trigger any other layer elements within the Service Oriented Architecture to further process at least an element of a on demand real time professional services engagement.

3. The computer system of claim 2 wherein the Enablement Layer and the Presentation Layer are further configured to enable at least a user to at least request services, sell services, provision services, fulfill services, deliver services, post-deliver services, receive services, govern services, track services using a just in time distribution channel element, wherein the distribution channel element comprises:
   an electronic commerce distribution channel element configured to process at least a professional services engagement element wherein at least a currency denomination is processed on demand, just in time;
   a call center distribution channel element configured to process at least a professional services element wherein at least a currency denomination is processed on demand, just in time;
   wherein the Enablement Layer and the Presentation Layer trigger any other elements within the Service Oriented Architecture to further process at least an element of a on demand professional services engagement.

4. The computer system of claim 1 wherein the Authentication Layer is further configured to enable at least a user to sign on, sign off one or more elements of the system on at least a user session; and
   wherein the system recognizes the at least one user individually giving the at least one user security access to one or more elements of the system with personalization based on security privileges assigned to the at least one user;
   wherein one or more elements of the system is further configured to enable further encryption; wherein one or more elements are further configured triggers any other elements within the Service Oriented Architecture to further authenticate, secure, encrypt, process at least an element of a on demand professional services engagement.

5. The computer system of claim 1 wherein the Productized Services Layer is further configured to enable at least a user to process at least a productized service function based on a hierarchal tier structure; wherein at least a single tier productized service function triggers the selling, provisioning, fulfilling, delivering, post-delivery of at least an element of:
   On Demand Consultation a on demand, real time consultation for a fee; wherein at least a consultation is administered for immediate commerce; wherein at least a consultation is processed face to face using at least a video, audio element; wherein at least an audit trail of the video, a video transcript of the video, video's audio is at least stored, retrievable in a video repository element; wherein a solutions knowledgebase element is triggered to assist at least a professional services user with responses to simple, complex professional services questions based on industry, regulatory, organization, competency, business unit, productized service requirement; wherein data collected during consultation call is automatically written by system to a solution, knowledgebase repository element; wherein an appointment messaging element is triggered based on at least a user's schedule availability, skill-sets needed, workload, time in queue; wherein the consultation is paid for in line with a project management approach, project management scope, price, contract, project management milestone, bill rate; wherein an electronic payment of practitioner, contractor is paid to at least user in real time in the sales, provisioning, fulfillment, delivery, post-deliver of at least an element of a on demand, just in time project engagement;
   On Demand Meeting Contribution a on demand, real time meeting for a fee; wherein at least a meeting is administered for immediate commerce; wherein at least a meeting is further configured is processed face to face using at least a video conferencing, audio conferencing element wherein at least a user is able to at least collaborate with at least one other user face to face in real time, share computer screens, whiteboards; wherein at least a meeting is further configured is processed using at least a remote control element wherein at least a user is able to at least take over, access at least one other computer, whether or not a user is face to face, in real time; wherein at least an audit trail of at least an element of a video conference, audio conference, remote control is at least stored, retrievable in a video, audio repository element; wherein at least an element of a video, audio conference, remote control transcript is stored, retrievable in a repository element; wherein at least a solutions, knowledgebase element is triggered to assist at least a professional services user with responses to simple, complex professional services questions based at least on industry, regulatory, organization, competency, business unit, productized service, project methodology, system methodology requirement; wherein data collected during meeting is automatically written by system to a solution, knowledgebase repository element; wherein an appointment messaging element is triggered based on at least a user's schedule availability, skill-sets needed, workload, time in queue; wherein the meeting contribution is paid for incrementally in line with a project management approach, project management scope, price, contract, project management milestone, bill rate; wherein an electronic payment of practitioner, contractor is paid to at least user in real time in the sales, provisioning, fulfillment, delivery, post-deliver of at least an element of a on demand, just in time project engagement;
   On Demand Deliverables Outsourcing a on demand, real time document deliverable, simple work product for a fee; wherein at least an element of a document deliverable, simple work product is administered for immediate commerce; wherein at least an element of a document deliverable, simple work product is processed face to face using at least a video conferencing, audio conferencing element wherein at least a user is able to at least collaborate with at least one other user face to face in real time, share computer screens, whiteboards; wherein at least a document deliverable, simple work product is processed using at least a remote control element wherein at least a user is able to at least take over, access at least one other computer, whether or not a user is face to face, in real time; wherein at least an audit trail of at least an element of a video conference, audio conference, remote control is at least stored, retrievable in a video, audio repository element; wherein at least an element of a video, audio conference, remote control transcript is stored, retrievable in a repository element; wherein at least a solutions, knowledgebase element is triggered to assist at least a professional services user with responses to simple, complex professional services questions based at least on industry, regulatory, organization, competency, business unit, productized service project management, system methodology requirement; wherein data collected during meeting is automatically written by system to a solution, knowledgebase repository element; wherein an appointment messaging element is triggered based on at least a user's schedule availability, skill-sets needed, workload, time in queue; wherein the document deliverable, simple work product is fulfilled incrementally; wherein the document deliverable, simple work product is paid for incrementally in line with a project management approach, project management scope, project management milestone, bill rate; wherein an electronic payment of practitioner, contractor is paid to at least user in real time in the sales, provisioning, fulfillment, delivery, post-deliver of at least an element of a on demand, just in time project engagement;

On Demand Project Outsourcing a on demand, real time full scale project for a fee; wherein at least an element of a full scale project is administered for immediate commerce; wherein at least an element of a full scale project is processed face to face using at least a video conferencing, audio conferencing element wherein at least a user is able to at least collaborate with at least one other user face to face in real time, share computer screens, whiteboards; wherein at least a full scale project is processed using at least a remote control element wherein at least a user is able to at least take over, access at least one other computer, whether or not a user is face to face, in real time; wherein at least an audit trail of at least an element of a video conference, audio conference, remote control is at least stored, retrievable in a video, audio repository element; wherein at least an element of a video, audio conference, remote control transcript is stored, retrievable in a repository element; wherein at least a solutions, knowledgebase element is triggered to assist at least a professional services user with responses to simple, complex professional services questions based at least on industry, regulatory, organization, competency, business unit, productized service requirement; wherein data collected during meeting is automatically written by system to a solution, knowledgebase repository element; wherein an appointment messaging element is triggered based on at least a user's schedule availability, skill-sets needed, workload, time in queue; wherein the full scale project is fulfilled incrementally; wherein the full scale project is paid for incrementally in line with a project management approach, project management scope, project management milestone, price, contract, project management milestone, bill rate; wherein an electronic payment of practitioner, contractor is paid to at least user in real time in the sales, provisioning, fulfillment, delivery, post-deliver of at least an element of a on demand, just in time project engagement;

On Demand Staff Augmentation a on demand, real time human practitioner for a fee; wherein at least an element of a full scale project is administered for immediate commerce; wherein at least an element of a full scale project is processed face to face using at least a video conferencing, audio conferencing element wherein at least a user is able to at least collaborate with at least one other user face to face in real time, share computer screens, whiteboards; wherein at least a full scale project is processed using at least a remote control element wherein at least a user is able to at least take over, access at least one other computer, whether or not a user is face to face, in real time; wherein at least an audit trail of at least an element of a video conference, audio conference, remote control is at least stored, retrievable in a video, audio repository element; wherein at least an element of a video, audio conference, remote control transcript is stored, retrievable in a repository element; wherein at least a solutions, knowledgebase element is triggered to assist at least a professional services user with responses to simple, complex professional services questions based on industry, regulatory, organization, competency, business unit, productized service requirement; wherein data collected during meeting is automatically written by system to a solution, knowledgebase repository element; wherein an appointment messaging element is triggered based on at least a user's schedule availability, skill-sets needed, workload, time in queue; wherein human practitioner project is fulfilled incrementally; wherein the human practitioner project is paid for incrementally in line with a project management approach, project management scope, price, contract, project management milestone, bill rate; wherein is further configured at least a human practitioner user are interviewed, selected to begin work on the spot; wherein the human practitioner can begin work immediately remotely once selected or on scheduled date at or on at least a user's premise location; wherein time sheets are created, updated, deleted, managed, routed for approval; wherein an electronic payment of contractor is paid to at least a human practitioner user in real time in the sales, provisioning, fulfillment, delivery, post-deliver of at least an element of a on demand, just in time project engagement;

wherein at least one single tier productized services element is decomposed into at least one additional multi-tier productized attribute structure as one or more line item elements;

wherein the Productized Services Layer triggers any other elements within the Service Oriented Architecture to further process at least an element of a on demand professional services engagement.

6. The computer system of claim 1 further enabling the Applications Layer or Functions Layer configured to plug into existing Commercial off the Shelf (COTS), Software as a Service (SaaS), custom applications, custom programs to process one or more elements of the system; create, compile, decompile, delete program code to process one or more elements of the system;

wherein one or more elements within the Application Layer or Functions Layer triggers any other elements within the Service Oriented Architecture to further process at least an element of a on demand professional services engagement.

7. The computer system of claim 1 wherein the Integration (SOA) Layer is further configured to create, read, update, delete, disable, process standardized, repeatable, reusable elements within the system;

wherein at least an element of the system bring together one or more subsystems components of at least one other system on a interoperation basis is configured to function together within the system to process one or more standard, repeatable or reusable elements within the system; wherein the Integration (SOA) Layer functions is further configured to trigger any other elements within the Service Oriented Architecture to further process at least an element of a on demand professional services engagement.

8. The computer system of claim 1 wherein the SOA Component Layer is further configured to enable at least one user to create, read, update, delete, disable, process unique subcomponent elements minimally comprising processes, rules, workflows, algorithms, messaging, data, other element that supports the interoperability of the system;

wherein at least a process, rule, workflow, algorithm, message, data, other element is configured to further enable the standard, repeatable and reusable functions of the system; wherein the SOA Component Layer functions triggers any other elements within the Service Oriented Architecture to further process at least an element of a on demand professional services engagement.

9. The computer system as recited in claim 6 further comprising at least a record source plug in at least an element of an existing application, at least an element of at least a program code is configured shall minimally contain at least a page, view, tab, field, data element wherein at least a record source page, view, tab, field, data element contain at least a:

sales element; post-delivery support element; call center element; marketing element; human resource element; accounting element; supply chain element; billing element; collaboration element; project management element; workforce element; commerce, ecommerce element; remote control element; security element; video conferencing element; video element; audio conferencing element; audio element; telephony element; call center element; project management element; methodology element; business intelligence element; data warehouse element; system methodology element; industry element; regulatory element; productized services element; workflow element; contract element; custom programming element;

wherein the record source page, view, tab, field, data element is further configured triggers any other elements within the Service Oriented Architecture to further process at least an element of a on demand professional services engagement.

10. The computer system of claim 6 wherein the call center element triggers a premise, virtual toll free number provisioning element; Interactive Voice Response element; Automated Call Distributor element; Computer Telephony Integration element; PBX element; messaging element; call tracking element; call monitoring element; call forwarding element; skills based call routing element; call forecasting element; queue management element; call recording element; call transcription element; voice broadcast element; click to call element; internet to phone element; work in progress bin element; department locator element; DNS element;

wherein the call center element triggers any other elements within the Service Oriented Architecture to further process at least an element of a on demand professional services engagement.

11. The computer system of claim 10 further comprising a workforce element includes at least a planning element, a performance analysis element, a scheduling element;

wherein the planning element enables at least a user to plan at least a scheduling campaign, event, roster, calendar, budget, service level, other workforce planning element;

the performance analysis element enables at least a user to minimally predict call types, call volume, total talk time, time to answer, call duration, time in queue, trunk capacity, practitioner skills, call staffing, call trends, create, view, update, delete workforce reports, analytics;

the scheduling element enables the system to locate at least one user; wherein the at least one user user's schedule may be displayed; wherein the system locates the at least one user, user's schedule based on at least a telephony communication, automatic trigger, manual trigger;

wherein at least a user schedule, performance, planning element triggers at least a: productized services element; marketing element; load balancing element; methodology element; commerce, ecommerce element; contract element; a regulatory element; video collaboration element; audio collaboration element; offline communication element; professional services skills element; appointment element; forecasting element; policies element; workflow element;

wherein the workforce element triggers any other elements within the Service Oriented Architecture to further process at least a component of a on demand professional services engagement.

12. The computer system of claim 1 further comprising:

at least an element of the system comprises determining needs, scope of the project in real time;

at least a system program, logic, Internet page, record source, or other element for at least a user to determine the needs, scope includes presenting a set of at least two questions to at least a user wherein the at least one question whether or not presented to the at least a user depends upon data previously provided by the at least a user;

the system further comprises a dynamic logic tree of data, a procedure for automatically and dynamically deciphering a next set of logic questions based upon at least a user's answers, a procedure for processing and retrieving relevant scope data wherein minimally at least a productized service, user schedule, user skills, man hours, level of effort, engagement size, delivery duration, human and technical resources needs, deliverables, work products, costs, ancillary fees, assumptions, constraints, risks, contingencies, change control, methodology, regulatory requirement, load balance, contract element is presented to the at least a user;

wherein the procedure for auto-generating pre-populated forms, documents containing finalized results; wherein the needs, scope element triggers any other elements within the Service Oriented Architecture to further process at least a component of a on demand professional services engagement.

13. The computer system of claim 1 further comprising at least an element of the system configured to determine a price of the project in real time;

wherein at least a system program, logic, Internet page, record source, or other element for at least a user to determine the price includes presenting a set of at least two questions to at least a user;

wherein the at least one question whether or not presented to the at least a user depends upon data previously provided by the at least a user; wherein the system further comprises a dynamic logic tree of data; a procedure for automatically and dynamically deciphering a next set of logic questions based upon at least a user's answers; a procedure for processing and retrieving relevant price data wherein at least a scope, productized service, user schedule, user skills, man hours, level of effort, engagement size, delivery duration, human and technical resources needed, deliverables, work products, ancillary fees, assumptions, constraints, risks, contingencies, change control, methodology, regulatory requirement, load balance, contract element is presented to the at least a user; a procedure for auto-generating pre-populated forms, documents containing finalized results;

wherein the pricing element triggers any other elements within the Service Oriented Architecture to further process at least a component of a on demand professional services engagement.

14. The computer system of claim 1 further comprising the at least an element of the system configured to determine contract stipulations of the project in real time;

wherein at least a system program, logic, Internet page, record source, or other element for at least a user to determine the contract includes presenting a set of at least two questions to at least a user;

wherein the at least one question whether or not presented to the at least a user depends upon data previously provided by the at least a user; wherein the system comprises a dynamic logic tree of data; a procedure for automatically and dynamically deciphering a next set of logic questions based upon at least a user's answers; a procedure for processing and retrieving relevant contract data wherein minimally at least a scope, productized service, user schedule, user skills, man hours, level of effort, engagement size, delivery duration, human and technical resources needed, deliverables, work products, price, ancillary fees, assumptions, constraints, risks, contingencies, change control, methodology, regulatory requirement, load balance element is presented to the at least a user; wherein a procedure for automatically and dynamically obtaining electronic signatures; a procedure for processing and retrieving relevant electronic signatures wherein at least a signature is presented to at least a user;

wherein a contract procedure for auto-generating at least a pre-populated form, document containing finalized results;

wherein the contract element any other elements within the Service Oriented Architecture to further process at least a component of a on demand professional services engagement.

15. The computer system of claim 1 further comprising at least an element of the system configured to determine at least a methodology of the project in real time;

wherein at least a system program, logic, Internet page, other element for at least a user to determine at least a methodology includes presenting a software development element, a project management element, a specialized industry element, an organization element; wherein the software development element contains at least an element of agile, waterfall, object oriented, rapid application, dynamic systems development method, scrum, team software process, extreme programming, iterative development, other; wherein is further configured the project management element contain at least a project approach element minimally to include Relationship Approach to Systems Development, Waterfall, Rational Unified Process, other; wherein the project management element contain at least a phase of project management includes at least a plan, analysis, design, development, test, train, cutover, delivery element relative to specialized industry life cycle; wherein the project management element contain at least a milestone element; wherein the project management element contain at least a task element; wherein the project management element contain at least a ecommerce element;

wherein the project management element contain at least a work breakdown structure element;

wherein the project management element contain at least a procedure for auto-generating pre-populated project templates, forms, documents containing finalized results; wherein the project management element contain at least a change control procedure element; wherein the specialized industry element contain at least an Information Technology, Engineering, Accounting, Legal, Construction, other specialized industry element; wherein the project management, system element contains at least a specialized industry regulatory element to minimally include Sarbanes-Oxley compliance triggers;

wherein the organization element contains at least an element of organization life cycle relative to a specialized industry;

wherein organization element contains at least a practice group, business unit, competency, capability element;

wherein the methodology element triggers any other elements within the Service Oriented Architecture to further process at least a component of a on demand professional services engagement.

16. The computer system as recited in claim 1 further comprising at least an element of the system comprises real time commerce, electronic commerce transactions containing at least a payment method of cash, credit card, electronic check, debit, or escrow; thereby enabling pay as you go commerce, electronic commerce, project approach methodology;

wherein the commerce, electronic commerce element triggers any other element within the Service Oriented Architecture to further process at least a component of a on demand professional services engagement.

17. The computer system as recited in claim 1 further comprising:

a collaboration element that triggers at least a real time communication between at least two users, wherein the real time communication is further configured contain; at least a button that trigger real time communication between users;

a remote control element that accesses at least a system that enables the ability to view, collaborate with, take over a sales, fulfillment, delivery element in real time; at least a real time video conferencing element that trigger video, video conferencing communication between users; at least an audio element that trigger real time audio between users;

a real time messaging element that trigger real time messages between users;

a chat element that trigger real time messaging between users;

a social networking element that trigger real time messaging between users;

wherein the collaboration element triggers any other collaboration elements within the Service Oriented Architecture to further process at least an element of a on demand professional services engagement.

18. The computer system as recited in claim 17 further comprising an element of the system configured to enable a load balancing element that triggers at least a process, rule, workflow, algorithm, messaging, data element that combines, triggers at least: a productized service element, call center element, workforce planning, analysis, schedule element, marketing element; organization, practice, business unit element, system role and responsibility privilege element, project role and responsibility privilege element, regulation, system, project approach methodology element, work in progress bin element, queue element; call center forecasting, organization campaigns, spoken language, skill-set, or other system element;

wherein the load balancing element triggers any other elements within the Service Oriented Architecture to further process at least a component of a on demand professional services engagement.

* * * * *